(12) United States Patent
Huang et al.

(10) Patent No.: US 12,182,674 B2
(45) Date of Patent: Dec. 31, 2024

(54) SOUND DETECTION FOR ELECTRONIC DEVICES

(71) Applicant: Apple Inc., Cupertino, CA (US)

(72) Inventors: Jonathan Huang, Pleasanton, CA (US); Miquel Espi Marques, Cupertino, CA (US); Carlos M. Avendano, Campbell, CA (US); Kevin M. Durand, San Francisco, CA (US); David Findlay, Grimsby (CA); Vasudha Kowtha, Sunnyvale, CA (US); Daniel C. Klingler, San Jose, CA (US); Yichi Zhang, Foster City, CA (US)

(73) Assignee: Apple Inc., Cupertino, CA (US)

( * ) Notice: Subject to any disclaimer, the term of this patent is extended or adjusted under 35 U.S.C. 154(b) by 213 days.

(21) Appl. No.: 17/737,017

(22) Filed: May 4, 2022

(65) Prior Publication Data

US 2022/0391758 A1 Dec. 8, 2022

Related U.S. Application Data

(60) Provisional application No. 63/197,486, filed on Jun. 6, 2021.

(51) Int. Cl.
*G10L 15/16* (2006.01)
*G06F 3/16* (2006.01)
(Continued)

(52) U.S. Cl.
CPC .............. *G06N 20/00* (2019.01); *G06F 3/16* (2013.01); *G08B 21/18* (2013.01); *G10L 15/063* (2013.01);
(Continued)

(58) Field of Classification Search
CPC ...... H04R 3/005; H04R 29/00; H04R 29/004; H04R 29/008; G10L 15/063; G10L 15/16; G10L 15/22; G10L 15/12; G10L 25/78
(Continued)

(56) References Cited

U.S. PATENT DOCUMENTS 10,658,005 B1   5/2020  Bogan, III et al.
10,715,470 B1 * 7/2020  Rolia ...................... G06F 40/30
(Continued)

FOREIGN PATENT DOCUMENTS

WO   WO2021/030918   2/2021

OTHER PUBLICATIONS

Li et al., "Are Fewer Labels Possible for Few-shot Learning?" Dec. 2020, retrieved from https://arxiv.org/pdf/2012.05899.pdf, 11 pages.

*Primary Examiner* — Disler Paul
(74) *Attorney, Agent, or Firm* — BAKERHOSTETLER

(57) ABSTRACT

The subject disclosure provides systems and methods for providing locally trained models for detecting individual sounds using electronic devices. Local detection of individual sounds with a detection model at an electronic device can be provided by obtaining training samples for the detection model with the electronic device, and generating additional negative and positive training samples based on the obtained training samples. A two-stage detection process may be provided, in which a trigger model at a device compares an audio input to a reference sound to trigger a detection model at the device. The detection of individual sounds with a detection model at an electronic device can also leverage audio capture capabilities of multiple devices in an acoustic scene to capture multiple concurrent training samples.

28 Claims, 11 Drawing Sheets

(51) Int. Cl.
  *G06N 20/00* (2019.01)
  *G08B 21/18* (2006.01)
  *G10L 15/06* (2013.01)
  *H04R 1/08* (2006.01)
  *H04R 29/00* (2006.01)

(52) U.S. Cl.
  CPC ............... *G10L 15/16* (2013.01); *H04R 1/08* (2013.01); *H04R 29/00* (2013.01)

(58) Field of Classification Search
  USPC .................................... 381/56–57, 92, 110
  See application file for complete search history.

(56) References Cited

U.S. PATENT DOCUMENTS

| | | | |
|---|---|---|---|
| 10,867,611 B2 * | 12/2020 | Tan | G10L 17/04 |
| 11,462,237 B2 * | 10/2022 | Yao | G06N 3/08 |
| 2015/0348554 A1 | 12/2015 | Orr et al. | |
| 2016/0379456 A1 | 12/2016 | Nongpiur et al. | |
| 2019/0341054 A1 | 11/2019 | Krupka et al. | |
| 2019/0341055 A1 | 11/2019 | Krupka et al. | |
| 2022/0343895 A1 * | 10/2022 | Tomar | G10L 15/16 |

\* cited by examiner

SOUND DETECTION FOR ELECTRONIC DEVICES

CROSS REFERENCE TO RELATED APPLICATIONS

This application claims the benefit of priority to U.S. Provisional Patent Application No. 63/197,486, entitled, "Sound Detection for Electronic Devices", filed on Jun. 6, 2021, the disclosure of which is hereby incorporated herein in its entirety.

TECHNICAL FIELD

The present description relates generally to electronic devices including, for example, sound detection for electronic devices.

BACKGROUND

Audio classification models can be trained to classify general categories of sounds using vast training datasets gathered by hundreds, thousands, or potentially millions of devices. However, it can be challenging to detect and/or classify individual variations of general categories of sounds using these audio classification models.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Users of electronic devices may desire assistance with hearing a particular sound at a particular time for any of a variety of reasons. For example, a user may have a hearing impairment, a user may be located away from the source of the sound (e.g., outside or in another room), and/or a sound may be obscured by noise or other sounds in an acoustic scene.

Accordingly, it may be desirable to be able to provide an electronic device that can detect one or more individual sounds in an acoustic scene, and can provide an alert (e.g., an alert other than an acoustic alert or in addition to an acoustic alert, such as a visible alert or a tactile alert) when the particular sound is detected by the electronic device. As illustrative examples, a user of an electronic device may desire to receive a notification (e.g., a vibration, a flashing light, a text-based or image-based visual notification, or the like) when the doorbell in their house rings, when their toaster finishes a toasting cycle, when their washing machine or clothes dryer finishes a cycle, when a pet makes a sound (e.g., a dog barks, a cat meows, a bird chirps), etc.

However, because the individual sounds of a particular doorbell, toaster, washing machine, dryer, or pet can vary widely, it can be difficult to deploy a pre-trained acoustic model (e.g., pre-trained acoustic model for detecting washing machines) to a particular electronic device that can detect the particular sounds of interest (e.g., the particular washing machine in the home of the user) for the user of that device. Moreover, it can be challenging to obtain sufficient training data at each individual electronic device to train that device to recognize a particular individual sound.

Figure 1:
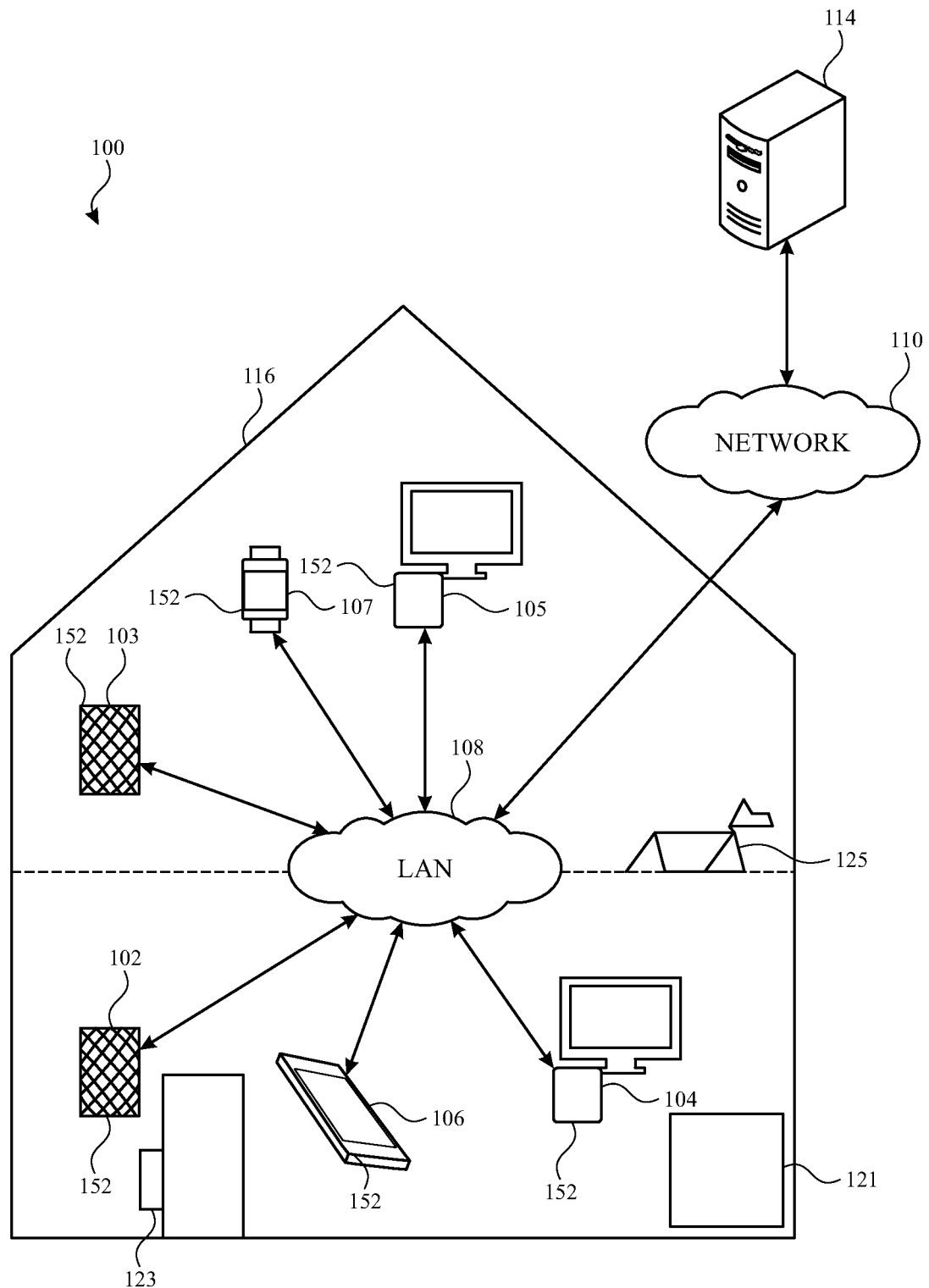
FIG. 1 illustrates an example network environment in accordance with one or more implementations.

In accordance with aspects of the disclosure, electronic devices are provided with sound detection models that can be trained on-device, using audio samples obtained by that device, to detect (e.g., and provide a corresponding notification or alert) individual sounds that are of interest to the user of that device. In one or more implementations, on-device training may include obtaining one or more audio samples of a sound using a device, generating one or more indirectly) couple any two or more of the electronic devices 102-107 within the connected home environment 116. Moreover, the network 110 may communicatively (directly or indirectly) couple any two or more of the electronic devices 102-107 with the server 114, for example, in conjunction with the LAN 108. Electronic devices such as electronic device 106 and electronic device 105 may communicate directly over a secure direct connection in some scenarios, such as when electronic device 106 is in proximity to electronic device 105. Although the electronic devices 102-107 are depicted in FIG. 1 as forming a part of a connected home environment in which all of the devices are connected to the LAN 108, one or more of the electronic devices 102-107 may not be a part of the connected home environment and/or may not be connected to the LAN 108 at one or more times.

In one or more implementations, the LAN 108 may include one or more different network devices/network medium and/or may utilize one or more different wireless and/or wired network technologies, such as Ethernet, optical, Wi-Fi, Bluetooth, Zigbee, Powerline over Ethernet, coaxial, Ethernet, Z-Wave, cellular, or generally any wireless and/or wired network technology that may communicatively couple two or more devices.

In one or more implementations, the network 110 may be an interconnected network of devices that may include, and/or may be communicatively coupled to, the Internet. For explanatory purposes, the network environment 100 is illustrated in FIG. 1 as including electronic devices 102-107, and the server 114; however, the network environment 100 may include any number of electronic devices and any number of servers.

One or more of the electronic devices 102-107 may be, for example, a portable computing device such as a laptop computer, a smartphone, a smart speaker, a peripheral device (e.g., a digital camera, headphones), a digital media player, a tablet device, a wearable device such as a smartwatch or a band, a connected home device, such as a wireless camera, a router and/or wireless access point, a wireless access device, a smart thermostat, smart light bulbs, home security devices (e.g., motion sensors, door/window sensors, etc.), smart outlets, smart switches, and the like, or any other appropriate device that includes and/or is communicatively coupled to, for example, one or more wired or wireless interfaces, such as WLAN radios, cellular radios, Bluetooth radios, Zigbee radios, near field communication (NFC) radios, and/or other wireless radios.

By way of example, in FIG. 1 each of the electronic devices 102-103 is depicted as a smart speaker, the electronic device 106 is depicted as a smartphone, the electronic device 107 is depicted as a smartwatch, and each of the electronic devices 104 and 105 is depicted as a digital media player (e.g., configured to receive digital data such as music and/or video and stream it to a display device such as a television or other video display). In one or more implementations, one or more of the electronic devices 104 and 105 may be integrated into or separate from a corresponding display device. One or more of the electronic devices 102-107 may be, and/or may include all or part of, the device discussed below with respect to FIG. 2, and/or the electronic system discussed below with respect to FIG. 13.

In one or more implementations, one or more of the electronic devices 102-107 may provide a system for training a machine learning model using training data, where the trained machine learning model is subsequently deployed to that electronic device and/or other one of the electronic device 102-107. Further, the electronic device 106 may provide one or more machine learning frameworks for training machine learning models and/or developing applications using such as machine learning models. In an example, such machine learning frameworks can provide various machine learning algorithms and models for different problem domains in machine learning. In an example, one or more of the electronic devices 102-107 may include a deployed machine learning model that provides an output of data corresponding to a prediction or transformation or some other type of machine learning output.

As shown in FIG. 1, the network environment 100 may include and/or overlap with an acoustic environment in which one or more objects and/or devices may generate sounds. In the example of FIG. 1, a doorbell 123, an appliance 121 (e.g., a dishwasher, a washing machine, a dryer, a toaster, a blender, microwave oven, etc.), and a pet 125 (e.g., a dog, a cat, a bird, etc.) are shown as objects that may generate sounds, for illustrative purposes. In various use cases, objects and/or devices may generate sounds that are specifically intended as alert sounds (e.g., the ring of a doorbell, or a buzzer or bell sounds at the end of an appliance cycle). In other use cases, objects and/or devices may generate sounds as part of the operation of the object and/or device. For example, the sound of an appliance running, or the sound of a garage door opening may be sounds that are generated as part of the normal operation of an object or device.

In one or more implementations, one of more of the electronic devices 102-107 may be configured to detect one or more specific sounds (e.g., the sound of the doorbell 123, a sound associated with an appliance 121, a sound of an object or device in operation or ceasing operation, or the sound of a pet 125) and to generate an alert, a notification, or other output when a specific sound is detected. For example, one or more of the electronic devices 102-107 may include one or more machine-learning models trained as sound classifiers. For example, one or more of the electronic devices 102-107 may include a pre-trained general sound classifier trained at another device or server and deployed to the electronic device (e.g., for general detection of general sounds, and which may not be able to detect to the specific sounds generated in a specific acoustic environment). As another example, one or more of the electronic devices 102-107 may include a trigger model and a detection model, trained at that electronic device using audio samples obtained by that electronic device and/or one or more others of the electronic devices 102-107. In one or more implementations, the trigger model may be configured to trigger operation of the detection model to detect a specific sound for which that detection model has been trained.

In one or more implementations, training sound samples may be obtained by one or more of the electronic devices 102-107 and provided to one or more others of the electronic devices 102-107, as described in further detail hereinafter.

In one or more implementations, the server 114 may be configured to perform operations in association with user accounts such as: storing data (e.g., user settings/preferences, files such as documents and/or photos, etc.) with respect to user accounts, sharing and/or sending data with other users with respect to user accounts, backing up device data with respect to user accounts, and/or associating devices and/or groups of devices with user accounts.

One or more of the servers such as the server 114 may be, and/or may include all or part of the device discussed below with respect to FIG. 2, and/or the electronic system discussed below with respect to FIG. 13. For explanatory purposes, a single server 114 is shown and discussed herein. However, one or more servers may be provided, and each different operation may be performed by the same or different servers.

Figure 2:
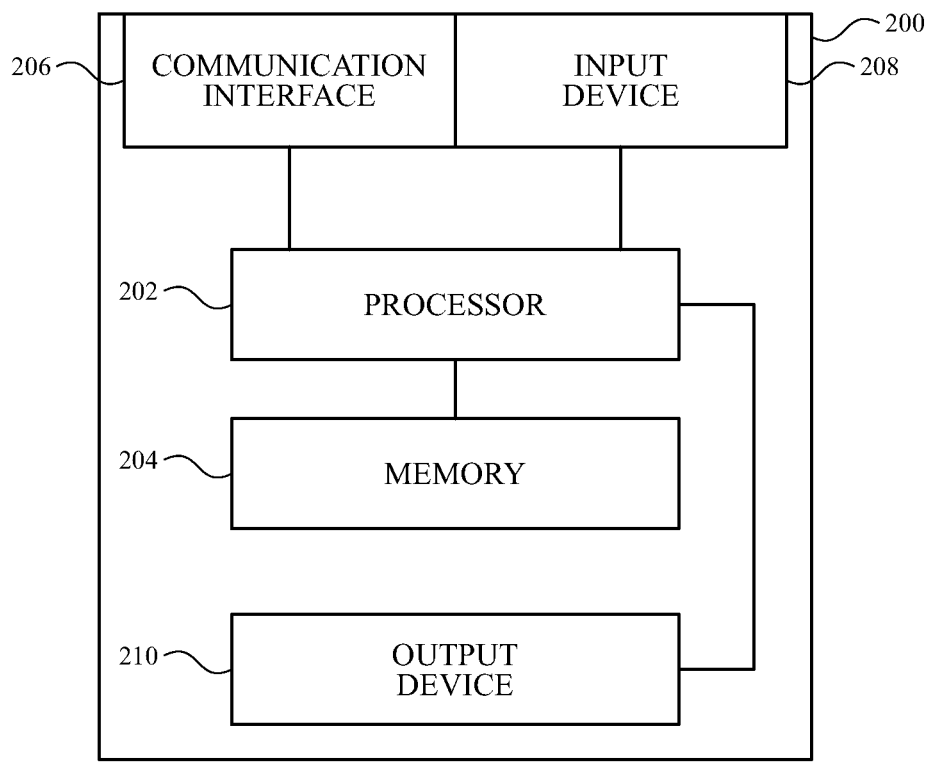
FIG. 2 illustrates an example device that may implement a system for sound detection in accordance with one or more implementations.

FIG. 2 illustrates an example device that may implement a system for sound detection in accordance with one or more implementations. For example, the device 200 of FIG. 2 can correspond to any of the electronic devices 102-107 and/or the server 114 of FIG. 1. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The device 200 may include a processor 202, a memory 204, a communication interface 206, an input device 208, and an output device 210. The processor 202 may include suitable logic, circuitry, and/or code that enable processing data and/or controlling operations of the device 200. In this regard, the processor 202 may be enabled to provide control signals to various other components of the device 200. The processor 202 may also control transfers of data between various portions of the device 200. Additionally, the processor 202 may enable implementation of an operating system or otherwise execute code to manage operations of the device 200.

The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage.

In one or more implementations, in a case where the device 200 corresponds to one of the electronic devices 102-107, the memory 204 may store one or more sound detection models, reference sounds, trigger models, and/or information associated with one or more user accounts for one or more applications and/or services, using data stored locally in memory 204. Moreover, the input device 208 may include suitable logic, circuitry, and/or code for capturing input, such as audio input, remote control input, touchscreen input, keyboard input, etc. The output device 210 may include suitable logic, circuitry, and/or code for generating notifications, alerts and/or other output, such as audio output, display output, light output, and/or haptic and/or other tactile output (e.g., vibrations, taps, etc.).

The communication interface 206 may include suitable logic, circuitry, and/or code that enables wired or wireless communication, such as between any of the electronic devices 102-107 and/or the server 114 over the network 110 (e.g., in conjunction with the LAN 108). The communication interface 206 may include, for example, one or more of a Bluetooth communication interface, a cellular interface, an NFC interface, a Zigbee communication interface, a WLAN communication interface, a USB communication interface, or generally any communication interface.

In one or more implementations, one or more of the processor 202, the memory 204, the communication interface 206, the input device 208, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
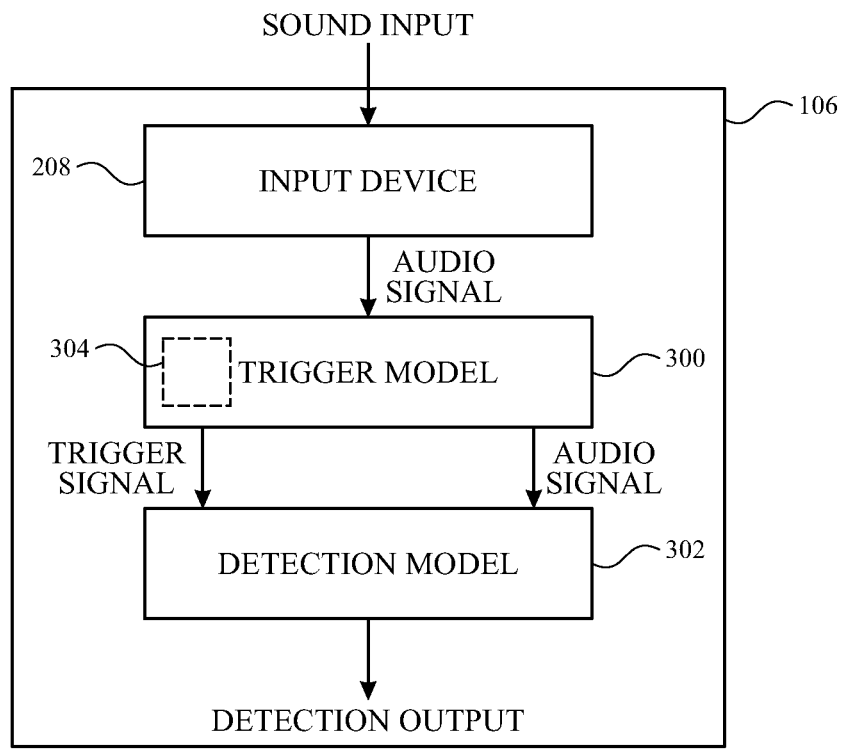
FIG. 3 illustrates an example sound detection operation by an electronic device in accordance with one or more implementations.

FIG. 3 illustrates an example process in which an electronic device such as electronic device 106 performs operations for sound detection (e.g., following on-device training of one or more sound detection models at the electronic device, as described in further detail hereinafter). As shown in the example of FIG. 3 a sound input (e.g., including one or more sounds occurring in the environment of an electronic device such as electronic device 106) may be received by the input device 208 (e.g., a microphone of the device). As shown, an audio signal corresponding to the sound input (e.g., a digitized and/or otherwise processed, encoded, and/or transformed version of the sound input) may be provided to a first classifier, such as a trigger model 300 at the electronic device. In one or more implementations, the audio signal include distributed representations of periodic or streaming audio captured by the input device 208 (e.g., in an operational mode in which the electronic device 106 is "listening" for one or more specific sounds for which one or more detection models have been trained at the electronic device 106).

In one or more implementations, the trigger model 300 may determine whether the audio input may contain the sound. For example, the trigger model 300 may compare the audio signal or a representation of the audio signal to a reference sound 304 (e.g., a corresponding representation of the reference sound). The reference sound 304 may be, for example, a device-generated class prototype, generated by the electronic device 106, as described in further detail hereinafter. In one or more implementations, the trigger model 300 may compare the audio signal to the reference sound 304 by determining a distance (e.g., a cosine distance) between the stored device-generated class prototype (e.g., the reference sound 304) and a representation of the audio signal (e.g., by computing the cosine distance between embeddings of the device-generated class prototype and the audio signal in a common embedding plane). As illustrated in FIG. 3, if the calculated distance determined by the trigger model 300 is less than a threshold (also referred to herein as a distance threshold or a similarity threshold), the audio signal may be escalated to a detection model 302 (e.g., to determine a class identity of the sound input). The detection model 302 may be trained at the electronic device 106 using training data obtained and/or generated by the electronic device 106, as described in further detail hereinafter.

As shown in FIG. 3, responsive to receiving the audio signal as an input, the detection model 302 may generate a detection output that indicates a class identity of the sound input (e.g., that indicates whether a specific sound, for which the detection model 302 has been trained on-device, has been detected and/or which of several specific sounds, for which the detection model 302 has been trained on-device, have been detected). In one or more implementations, when the detection output from the detection model 302 indicates that a specific sound has been detected, the electronic device 106 may generate an alert, notification, and/or other output indicating that the specific sound has been detected.

In the example of FIG. 3, the trigger model 300 provides a trigger signal to the detection model 302 when the audio signal includes a sound that is within a similarity threshold of the reference sound 304. However, this is merely illustrative, and the detection model 302 may be triggered or otherwise activated without providing a separate trigger signal, in some implementations. For example, in one or more implementations, the trigger model 300 passing the audio signal to the detection model 302 may cause the detection model 302 to generate the detection output.

Figure 4:
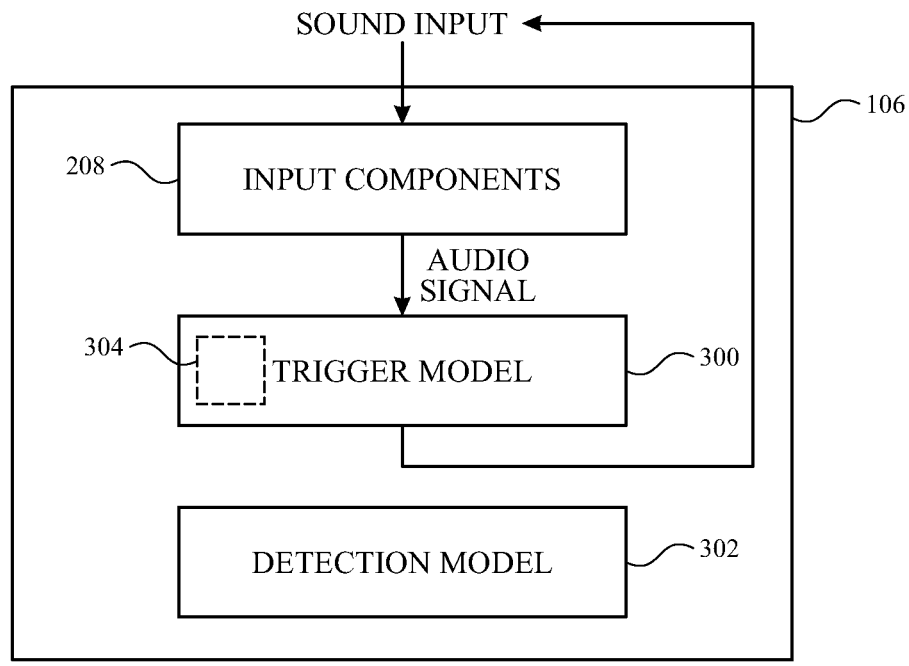
FIG. 4 illustrates another example sound detection operation by an electronic device in accordance with one or more implementations.

In contrast with FIG. 3, and as illustrated in FIG. 4, in a use case in which the calculated distance determined by the trigger model 300 is larger than a threshold, the inference audio block may be assigned to a negative class and the detection model 302 is not activated or triggered (e.g., and the electronic device 106 returns to listening for specific sounds in the ongoing sound input).

In the example of FIGS. 3 and 4, a two-pass framework (e.g. including the trigger model 300 as a first classifier or first pass classifier and the detection model 302 as a second classifier or second pass classifier) is provided, that may allow the electronic device 106 to perform as a customized sound detector that is able to detect specific and/or niche target sound classes, in streaming audio that most often may not include the target sound class. In these examples, a first pass of the proposed system uses a first pass model (e.g., the trigger model 300 and the device-generated class prototype or reference sound 304) to filter out audio blocks that are broadly dissimilar to a target class represented by the reference sound 304 generated at the electronic device 106. In these examples, the first pass may use the first pass model (e.g., the trigger model 300 with the reference sound 304) to filter out audio blocks that are broadly dissimilar to the target class, and may be instantiated via a low-power distance comparison module (e.g., based on a cosine distance). Providing the first pass model (e.g., the trigger model 300) may allow for a data-efficient training of a relatively small second stage classifier (e.g., the detection model 302). In this framework, the second classifier (e.g., a second pass model, such as the detection model 302) may be trained to discriminate between the target sound class and very similar sounds that belong to the negative class (e.g., using device-generated negative training samples as described hereinafter in further detail). In this framework, the second pass (e.g., the detection model 302) may provide flexibility and scope control over the class that is learned, without the cost of having to train the second pass model on a large negative corpus, as dissimilar sounds may be gated by the first pass model.

Providing electronic devices with the trigger model 300 and the detection model 302 may allow users to customize their devices to enable flexible, user-centric, privacy-preserving experiences, while maintaining a minimal user burden for training. In the example of FIGS. 3 and 4, a user of the electronic device 106 (and/or any other device associated with the same account as the electronic device 106) may be able to offload the task of listening attentively at all times for sounds of specific interest, to one or more microphone-enabled devices associated with the user's account, and may allow the user to quickly and efficiently specify arbitrarily niche sound detectors on their device(s).

As discussed above in connection with, for example, FIGS. 3 and 4, the reference sound 304 may be generated at the electronic device 106, and the detection model 302 may be trained on-device at the electronic device 106 using training data obtained and/or generated by the electronic device 106.

Achieving sufficient sound recognition performance for a flexible, customized sound detector that can detect any of various sound types often requires large amounts of training data. With sufficient training data, sound detectors can be flexibly constructed across acoustically dissimilar sound types (e.g., a music detector, a speech detector, an animal vocalization detector) and can be customized with respect to scope (e.g., a speech detector vs. an individual-speaker-detector vs. an individual-speaker-utters-specific-phrase detector). Sufficient training data for such sound detectors may include at least sufficient training data to approximate the true intra-class mean and variance (e.g., for the case of the individual-speaker detector, examples of the speaker uttering many different words and phrases, in many different rooms/settings, with many different overlapping background sounds, in many different speaking styles typical to that speaker). Moreover, a sufficient training dataset for a given sound detector may also include many "negative" examples, or sounds outside of the class of interest, in order for the classifier to learn not to mistakenly classify non-target sounds as belonging to the target class, during inference. Negative examples may include examples of other speakers uttering phrases in a variety of conditions, as well as a vast, representative set of non-speech sounds of many varieties.

However, it can be difficult or impossible for a single user of a single device to collect a dataset large and/or representative enough to detect individual specific sounds. Moreover, it may be undesirable (e.g., from a privacy perspective) to send sound samples obtained by a user's device off-device for model training and/or to provide a user's device with training data obtained from other users. Moreover, when a user wishes to enable a specific sound detector (e.g., a user who wants a sound detector to notify the user whenever a garage door opens), it may be the case that no canonical training corpus even exists to use for training, and/or would be prohibitively expensive and/or time-consuming for the user to collect.

In one or more implementations, the detection model 302 disclosed herein may be trained, in part, using training data generated at the device on which the detection model 302 is being trained, using synthetic data generation seeded by a minimal set of user-provided audio examples, and can instantiate robustness to sounds significantly outside of the class of interest via a custom two-stage inference architecture (e.g., in cooperation with the trigger model 300).

In contrast with, for example, devices that may allow construction of sound detectors only for a restricted set of sound types, aspects of the subject disclosure provide a framework and a set of associated systems and methods that may allow users to specify the construction of sound classifiers from few audio examples, while maintaining the ability to specify the scope and flexibility of the target class.

Figure 5:
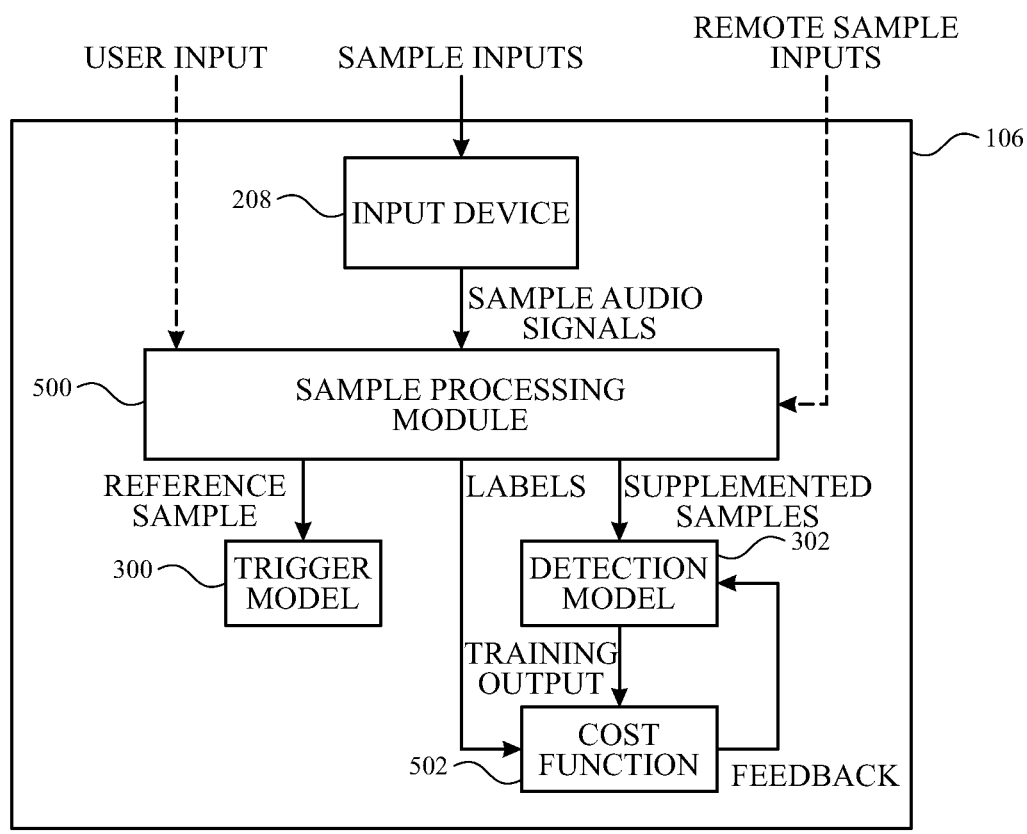
FIG. 5 illustrates an example training operation for sound detection by an electronic device in accordance with one or more implementations.

FIG. 5 is a schematic diagram illustrating operations that may be performed for training an electronic device, such as electronic device 106, to detect a specific sound (e.g., a sound of interest to a user of the electronic device). As examples, a user may want to train a custom sound detector on their electronic device that will generate an alert or notification when a toaster finishes a toasting cycle, when a garage door opens, when a dog barks, or when a particular person whistles a particular portion of a particular song.

As shown in the example of FIG. 5, input device 208 (e.g., a microphone) of an electronic device such as electronic device 106 may be used to obtain one or more sample inputs (e.g., 3-5 sample inputs, or any number of sample inputs desired by a user) of a sound for which a sound detector is being trained. The sample inputs may represent, for example, positive examples of the target class. For example, if a user of the electronic device 106 would like to train the electronic device 106 to detect the sound a toaster makes when a toasting cycle is complete (e.g., the sound of an audio alert from the toaster, or the mechanical sound of the toast being popped up), the user may operate the electronic device 106 to record several examples the toaster at the end of the toasting cycle, as the sample inputs. In one more implementations, the sample inputs may include examples of negative classes, such as the sounds of other appliances or outdoor sounds. In one or more implementations, the sample inputs obtained using the input device 208 do not include any negative samples.

In one or more implementations, the electronic device 106 may include a sample processing module 500 that receives the sample inputs and/or sample audio signals (e.g., digitized and/or otherwise processed signals based on the sample inputs). In one or more implementations, the sample inputs may be segmented samples including only the sound of the positive class. In one or more other implementations, the sample inputs may be obtained in unsegmented form (e.g., including portions that include other sounds or include only noise or do not include any detectable sounds) and the sample processing module 500 may retrieve segmented instances of the target class from the unsegmented sample inputs. In one or more implementations, the sample processing module 500 may perform other sample processing operations (e.g., selection and/or alignment) as discussed in further detail hereinafter.

As indicated in FIG. 5, the sample processing module 500 may generate a reference sample (e.g., reference sound 304 of FIG. 3) from the sample audio signals. For example, the sample audio signals and/or further processed sample audio signals may be combined to form a single "class prototype", representative of the class mean, which is stored by the electronic device (e.g., as the reference sound 304, in association with the trigger model 300 as shown).

As indicated in FIG. 5, the sample processing module 500 may also generate an augmented training dataset including, for example, supplemented samples, for training the detection model 302. In one or more implementations, the supplemented samples may include the sample audio signals and at least one device-generated training sound sample generated by the electronic device 106 based on sample audio signals. For example, the at least one device-generated training sound sample may include one or more negative training samples generated by the electronic device 106 (e.g., by the sample processing module 500) based on one or more first modifications of the sample audio signals, and/or one or more positive training sample generated by the electronic device 106 (e.g., by the sample processing module 500) based on one or more second modifications the sample audio signals.

As shown, the supplemented samples may be provided to the detection model 302 as training inputs, and labels (e.g., positive or negative labels) corresponding to the supplemented samples may be provided to a cost function 502. As shown, the cost function 502 may compare training outputs generated by the detection model 302 in response to the training inputs (e.g., the supplemented samples) with the corresponding labels, and provide feedback for adjustment of weights and/or other parameters of the detection model 302 based on the comparison.

As indicated in FIG. 5, in one or more implementations, the sample processing module 500 may also receive user input for generating the reference sample and/or the supplemented samples. For example, the user input may indicate which of several sample inputs are positive sample inputs (e.g., including the target sound) and which are negative sample inputs (e.g., including other sounds). In one or more other implementations, the sample processing module 500 may label all user-provided samples that are sufficiently similar as positive samples. In one or more implementations, a user of the electronic device 106 may also provide user input that specifies a set of operation-valence pairs that indicate transformations on the enrolled audio representation that, if applied, would either maintain or change the class identity of the transformed audio representation (as described in further detail hereinafter).

As indicated in FIG. 5, in one or more implementations, the sample processing module may also receive one or more remote sample inputs, such as sample inputs obtained by one or more other electronic devices (e.g., the electronic device 103, the electronic device 102, etc.) that are registered to and/or signed into the same account as the electronic device 106. For example, the remote sample inputs may be obtained concurrently with the sample inputs that are obtained directly by the electronic device 106 using the input device 208. In one or more implementations, the sample processing module 500 (e.g., the curation module 600) may segment, select, and/or align the remote sample inputs with the sample inputs obtained directly by the electronic device 106, may include one or more of the remote sample inputs in the supplemented samples, may exclude one or more of the remote sample inputs from being included in the supplemented samples, and/or may generate one or more additional supplemental samples based, in part, on the remote sample inputs.

In the example of FIG. 5, a classifier (e.g., the detection model 302) can be trained on-device during enrollment, using embeddings extracted from user-provided positive class audio examples, along with a larger (supplemented) set of training data that is produced by augmenting the user-provided positive class examples.

Figure 6:
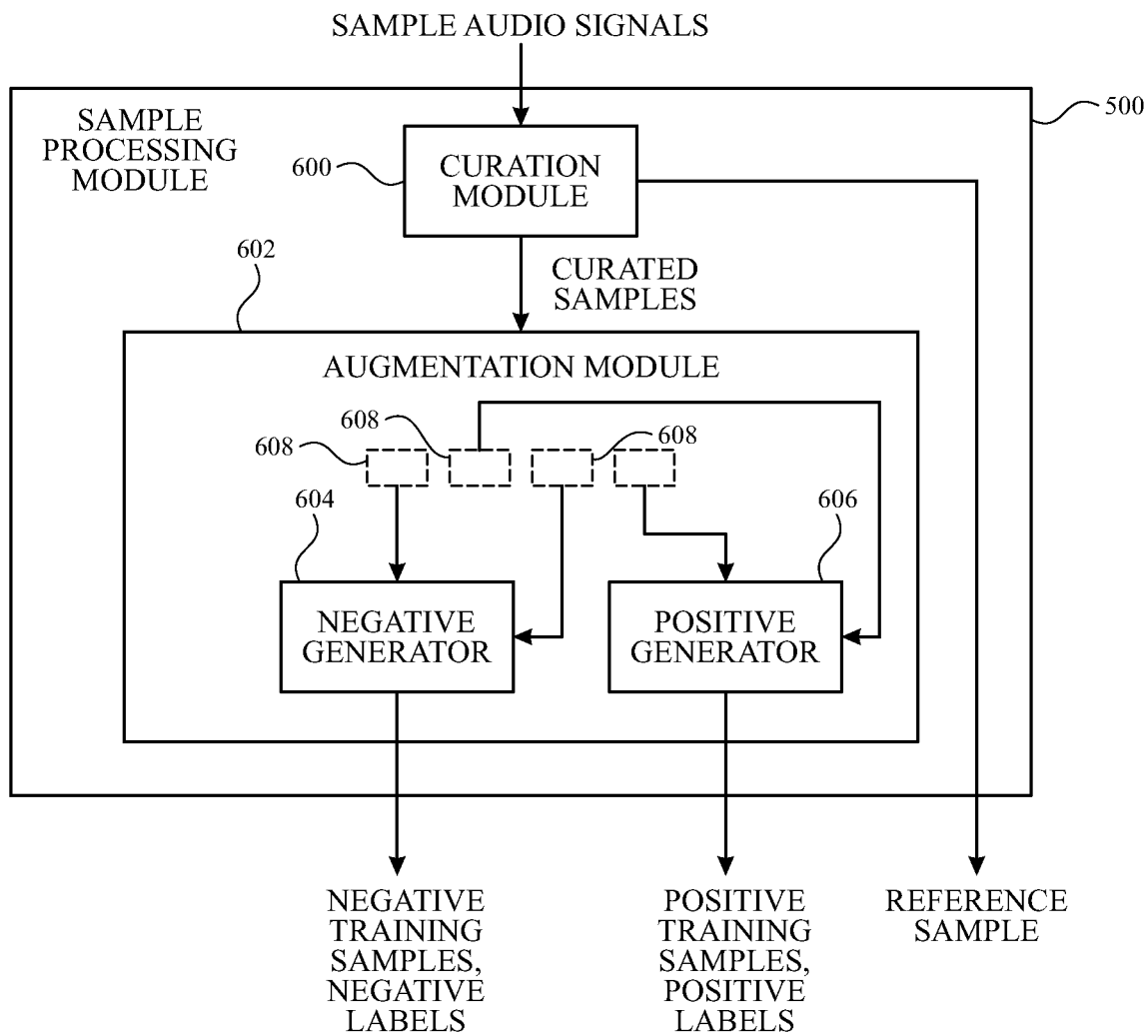
FIG. 6 illustrates example sample processing operations that may be performed by an electronic device in accordance with one or more implementations.

FIG. 6 illustrates example operations that may be performed by the sample processing module 500 of FIG. 5, including examples of generating, by the sample processing module 500 a larger (supplemented) set of training data that is produced by augmenting the user-provided positive class examples. As shown in FIG. 6, the sample processing module 500 may include a curation module 600 and an augmentation module 602 (e.g., a class-valence-transformation-module) in one or more implementations. The curation module 600 may generate, from sample audio signals corresponding to the sample inputs and/or the remote sample inputs of FIG. 5, one or more curated samples (e.g., high dimensional distributed representations of the sample audio signals) to be provided to the augmentation module 602. The sample audio signals and/or the curated samples may also be selected and/or combined by the curation module 600 to generate the reference sample (e.g., the reference sound 304) for the trigger model 300.

As shown in FIG. 6, the augmentation module 602 may store or have access to one or more transformations 608 that can be applied to the curated samples to generate one or more negative training samples and associated negative labels, and/or one or more positive training samples and associated positive labels. As one example, the transformations 608 may include a time-shuffle transformation by which the augmentation module 602 shuffles the audio content of a positive sample input in time, and, in some instances, changes the associated class label for the time-shuffled device-generated sample from positive to negative. As another example, the transformations 608 may also include a reverb transformation that adds reverb to the audio content of a positive sample input to generate a supplemental device-generated positive sample input. As another example, the transformations 608 may also include a pitch transformation that modifies the pitch of one or more portions of the audio content of a positive sample input to generate a supplemental device-generated positive sample input or supplemental device-generated negative sample input. As another example, the transformations 608 may include a noise transformation that adds noise content to the audio content of a positive sample input to generate a supplemental device-generated sample input. Depending on, for example, the signal-to-noise ratio (SNR) of the device-generated sample input generated using the noise transformation, the label for the device-generated sample input may remain positive (e.g., for modifications with a relatively high signal-to-noise above a SNR threshold) or may be changed to negative (e.g., for modifications with relatively low signal-to-noise below the SNR threshold). Other transformations 608 that may be applied to sample inputs to generate supplemental positive and/or negative training samples may include, for example, amplitude modifications, frequency modifications, and/or other transformations.

Various ones of the transformations 608 can be variously used to generate positive or negative audio samples from a sample input (e.g., a sample audio signal or a curated sample). For example, shuffling the audio content of a sample audio signal including a repeated dog bark, in time, may not change the content from sounding like the dog bark. In this case, applying a time-shuffle transformation may not result in a label change form positive to negative. In another example, shuffling the audio content of sample input including a person whistling a particular part of a song, in time, may change the content from sounding like that particular part of that song. In this case, applying a time-shuffle transformation may result in a label change from positive to negative. In the example of FIG. 6, the augmentation module 602 includes a negative generator 604 that generates negative training samples and associated negative labels using the transformations 608, and a positive generator 606 that generates positive training samples and associated positive labels using the transformations 608. However, this is merely illustrative, and one or more negative training samples and associated negative labels, and/or one or more positive training samples and associated positive labels can be generated, using the transformations 608, by a single augmentation module in one or more implementations.

In one or more implementations, the augmentation module 602 may determine whether a particular transformation applied to a particular curated sample generates a positive training sample or a negative training sample. In one or more other implementations, user input provided to the sample processing module 500 may be used to determine whether a particular transformation 608 applied to a particular sample creates a positive sample or a negative sample. For example, the augmentation module 602 may instantiate an operation specified by the user with an input of [time-shuffle, –], in which the "time-shuffle" indicates that the module shuffles the audio content in time, and the "–" indicates that the module changes the associated class label from positive to negative for the resulting training sample. As another example, the augmentation module 602 may instantiate an operation specified by the user with an input of [reverb,+], in which the "reverb" indicates that the module adds reverb to the audio content, and the "+" indicates that the module keeps the associated class label positive for the resulting training sample. As another example, the augmentation module 602 may instantiate an operation specified by the user with an input of [time-shuffle, +], in which the "time-shuffle" indicates that the module shuffles the audio content in time, and the "+" indicates that the module keeps the associated class label positive for the resulting training sample. In one or more implementations, more than one of the transformations 608 may be applied to an input training sample to generate a supplemental positive or negative training sample. In one or more implementations, the user may be provided with the ability to listen to a modified sample, and then input whether the modified sample should be labeled as a positive or negative sample.

Figure 7:
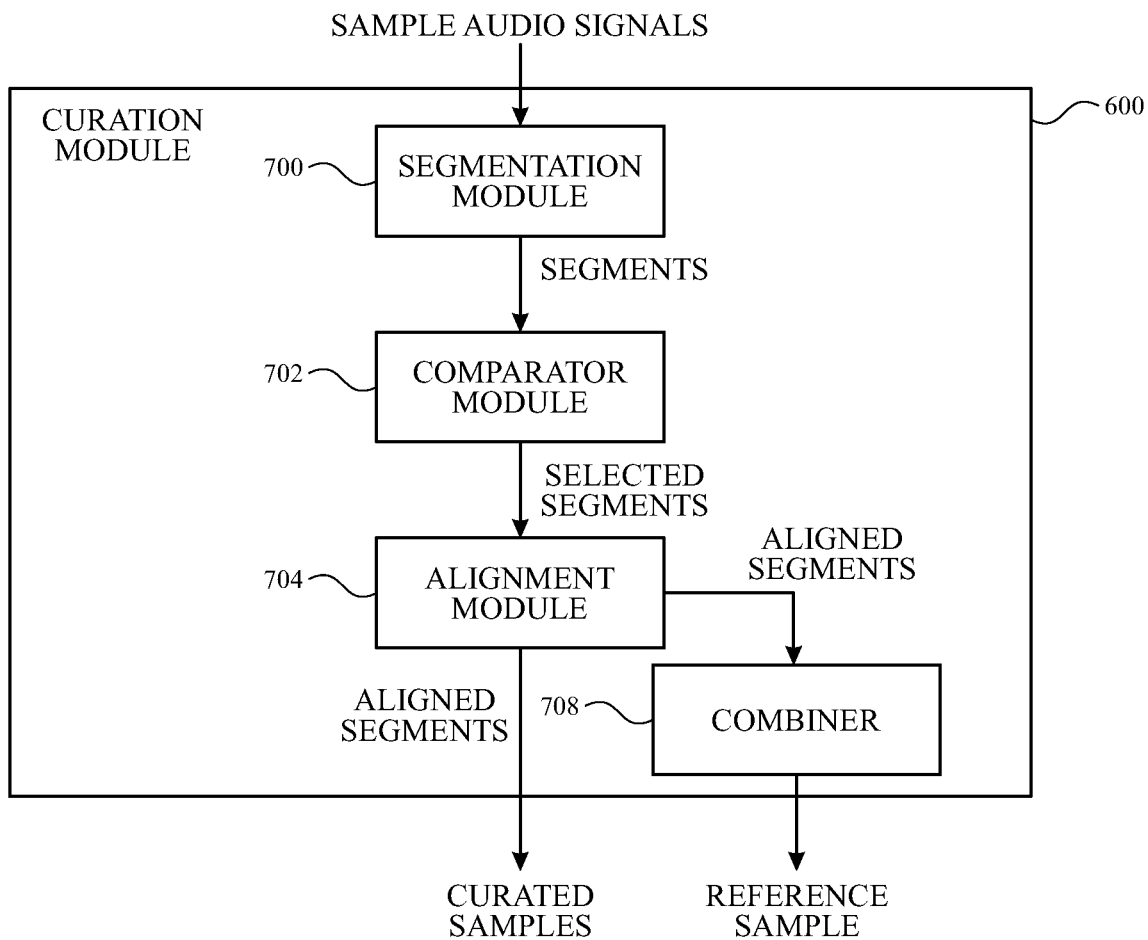
FIG. 7 illustrates example data curation operations that may be performed by an electronic device in accordance with one or more implementations.

FIG. 7 illustrates further features of the curation module 600 of FIG. 6, in accordance with one or more implementations. As shown in FIG. 7, the curation module 600 may include a segmentation module 700, a comparator module 702, and an alignment module 704. In one or more implementations, for each sample audio signal (see, e.g., FIG. 5), the segmentation module 700 may obtain a segment of that audio sample containing a sound. The segmentation module 700 may obtain the segment of each sample audio signal based on user input identifying the segment as containing the sound, or in an unsupervised segmentation operation (e.g., without user input, and based on time-frequency features of the sample audio signals that indicate which segment includes a sound).

As shown in FIG. 7, the segments containing the sounds may be provided to the comparator module 702. In one or more implementations, the comparator module 702 may extract selected segments that include the target sound. For example, the selected segments provided by the comparator module 702 may be high dimensional distributed representations of the sound in each of the segments from the segmentation module 700 that include the target sound. For example, the comparator module 702 may be implemented as an embedding extractor, and may include a pretrained classifier (e.g., pre-trained off device and deployed to the electronic device) with an embedding space that preserves relative perceptual acoustic similarity across acoustic attributes of interest. For example, two sounds that differ only in level may be transformed into representations that are more similar than two sounds that have dissimilar time-frequency characteristics. The embedding space of the comparator module may not be invariant to primary acoustic attributes that, if modified, change the valence of the underlying class. In this way, the segmentation module 700 and the comparator module 702 may extract audio sections (segments) with the target sound, out of multiple recordings (sample audio signals), without previous knowledge about the target sound, and generate distributed representations of the target sound computed using a pretrained feature extractor. This may allow, for example, a user to submit multiple examples of a target class in unsegmented form, from which the electronic device 106 can extract specific audio sections of the submitted multiple examples.

As shown in FIG. 7, in one or more implementations, the selected segments from the comparator module 702 may be provided to the alignment module 704. The alignment module 704 may align the selected segments (e.g., in time or in frequency), such as based on a cross-correlation of the selected segments, to generate aligned segments based on the sample audio inputs. As shown, the aligned segments may be output from the curation module 600, and may be provided as the curated samples to the augmentation module 602 (as described above in connection with FIG. 5).

FIG. 7 also shows how the aligned segments from the alignment module 704 may be provided to a combiner 708. In the example of FIG. 7, the combiner 708 is shown a part of the curator module 600, however, in other implementations, the combiner 708 may be separate from the curator module and may receive the aligned segments from the curator module 600. In one or more implementations, the combiner 708 may generate the reference sample (e.g., the reference sound 304, such as a device-generated class prototype) for the target sound included in the aligned segments, based on the aligned segments. As examples, the combiner 708 may select one of the aligned segments as the reference sound, or may combine (e.g., average or interpolate) two or more of the aligned segments to form the reference sample.

Figure 8:
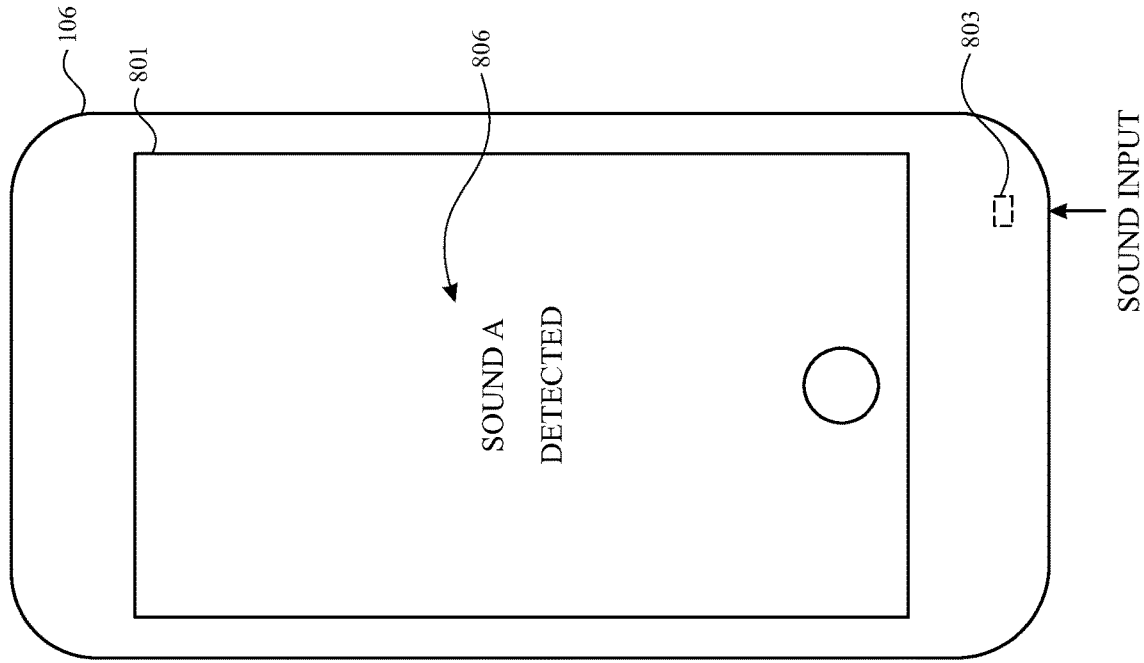
FIG. 8 illustrates an electronic device during a training operation and during a sound detection operation in accordance with one or more implementations.
Figure 8:
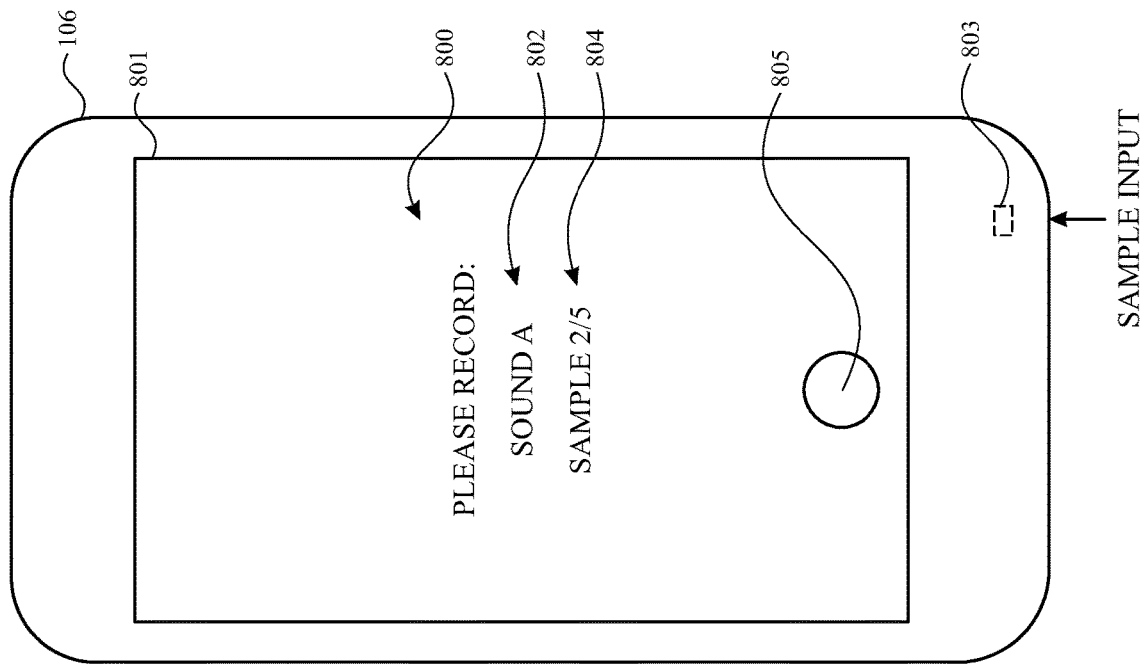

In one or more implementations, the electronic device 106 may provide user guidance for capturing one or more sample inputs for training the detection model 302 and/or for generating the reference sample for a specific sound. FIG. 8 illustrates an example in which, during training, the electronic device 106 provides (e.g., using a display 801) a request for the user to record samples of a sound being enrolled. In the example of FIG. 8, the request displayed by the display 801 includes an instruction 800 (e.g., "Please Record"), an identifier 802 (e.g., a name or type, such as "Sound A") of the sound being enrolled, and an indicator 804 (e.g., "Sample 2/5") of a number of samples requested. In this example, the electronic device 106 is requesting the recordation of the second of five requested samples. In this example, the user may select a record indicator 805 to initiate recording of a sample input (e.g., for the second of the five samples in this example), such as using a microphone 803 of the electronic device 106 or another microphone that is communicatively coupled to the electronic device 106.

FIG. 8 also illustrates how, after training and during normal operation of the electronic device 106 (e.g., after generation of the reference sound 304 for the trigger model 300 and after training of the detection model 302 using the sample inputs obtained during training, as described above in connection with FIGS. 5-7), when a sound input containing an enrolled sound is received (e.g., by the microphone 803 of the electronic device 106), the electronic device 106 may detect the enrolled sound (e.g., as described above in connection with FIG. 3) and provide a notification 806 (e.g., a text notification such as "Sound A Detected" using the display 801, and/or or another notification such as a light output or a tactile or haptic output), to indicate that the enrolled sound has been detected by the electronic device 106.

As described above in connection with for example, FIG. 1, in some scenarios, the environment of an electronic device such as electronic device 106 may include one or more other electronic devices, such as other electronic devices (e.g., electronic device 102 or electronic device 103) that are associated with (e.g., registered to and/or signed into) a common account of the electronic device 106 and that also have microphones (e.g., microphones 152). In one or more implementations, obtaining the training audio samples for generation of a reference sound 304 and/or for training of the detection model 302 may include concurrently obtaining audio samples with the electronic device and with one or more of the other electronic devices.

In one or more implementations, the audio samples obtained by the other device(s) can be provided to the electronic device 106, and curated by the curation module 600, together or separately from the sample inputs obtained directly by the electronic device 106. In one or more implementations, the curation module 600 may confirm that the audio samples obtained by the other device(s) include the same sound as sample inputs obtained directly by the electronic device 106 before using the audio samples obtained by the other device(s) for training at the electronic device 106. For example, in some use cases (e.g., in a case in which the electronic device 103 is in a noisy room with a closed door and thus does not receive audio input of the sound to be enrolled), the electronic device 106 (e.g., the curation module 600) may reject audio samples from the electronic device 103 that do not include the sound, or for which a noise background is too high, such as by determining that audio samples from the electronic device 103 are too dissimilar from sample inputs obtained directly by the electronic device 106. In other examples, the electronic device 106 (e.g., the curation module 600) may provide a noisy audio sample from the electronic device 103 that is too dissimilar from the sample inputs obtained directly by the electronic device 106, to the augmentation module 602 for use as a negative training sample. In one or more implementations, the audio samples obtained by the other device(s), and, in some instances, confirmed as including the sound included in the audio sample(s) obtained locally by the electronic device 106, can be used as additional positive training samples for training the detection model 302 (e.g., with positive labels, as described above in connection with FIG. 5).

In one or more implementations, concurrent audio sampling by the electronic device 106 and one or more other devices may be performed based on an instruction from the electronic device 106. In one or more other implementations, the electronic device 106 can (e.g., retroactively) obtain recent audio data captured at the other devices, during a time when an audio sample including a sound corresponding to a broad class for similar sounds is detected at the electronic device 106 or another one of the electronic devices (e.g., using a pretrained classifier at the detecting device).

Figure 9:
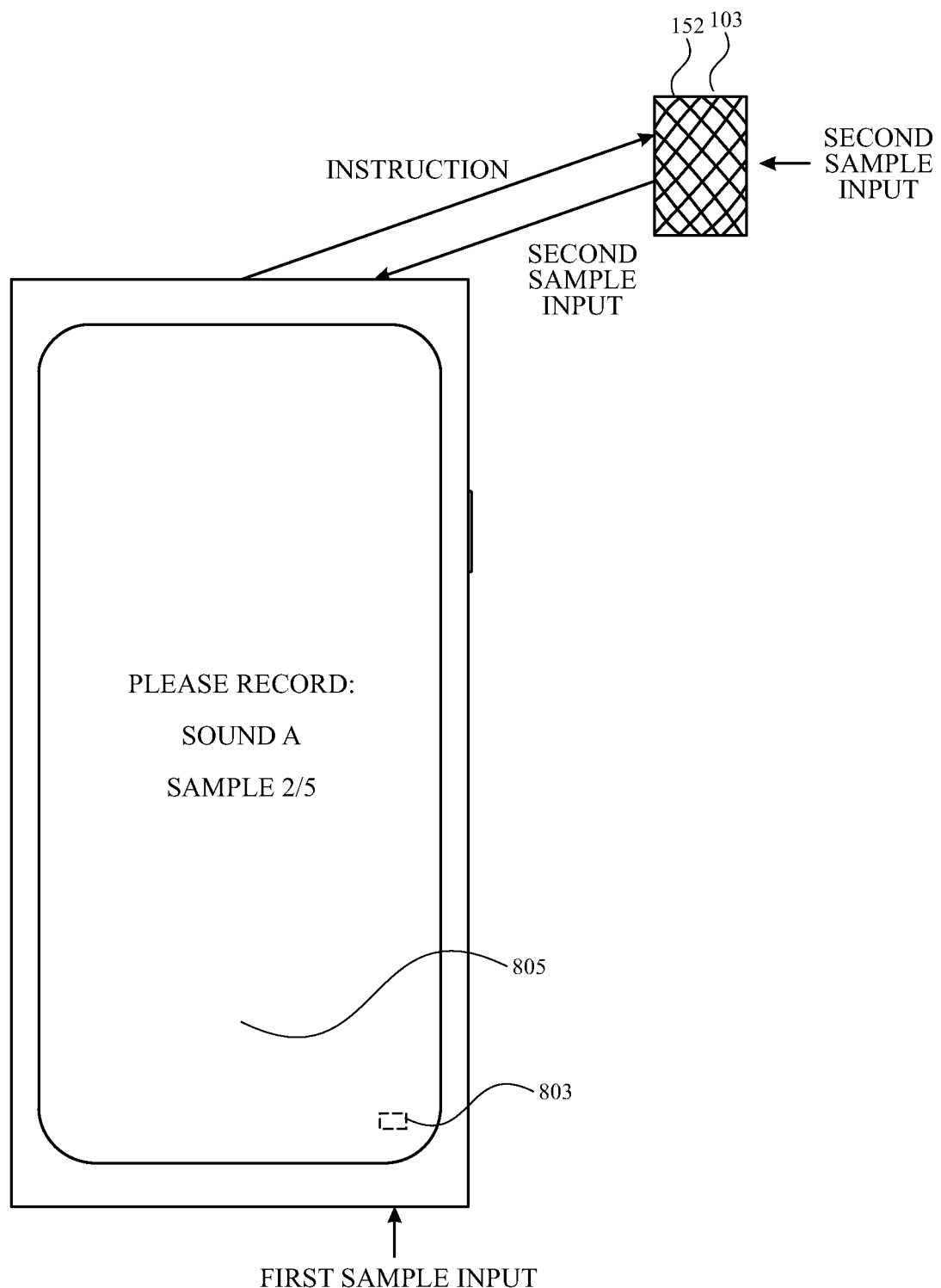
FIG. 9 illustrates an electronic device and another electronic device capturing concurrent training audio samples during a training operation in accordance with one or more implementations.

FIG. 9 illustrates a scenario in which concurrent audio sampling by the electronic device 106 and one or more other devices is performed based on an instruction from the electronic device 106. In the example of FIG. 9, the electronic device 106 may receive a user input to the record indicator 805 at the electronic device. Responsively, the electronic device 106 may operate the microphone 803 at the electronic device 106 to record a first sample input (e.g., while a target sound for enrollment is occurring in the environment of the electronic device 106), and may also provide an instruction to another electronic device, such as electronic device 103. As shown, responsive to the instruction from the electronic device 106, the electronic device 103 may obtain (e.g., using a microphone 152 at the electronic device 103), a second sample input (e.g., concurrently with the electronic device 106 obtaining the first sample input). As shown, the second sample input may be provided from the electronic device 103 to the electronic device 106. The second sample input may then be provided to the sample processing module 500 of FIG. 5 as a remote sample input, and processed along with the first sample input as described above in connection with, for example, FIGS. 5-7 (e.g., for generation of the reference sound 304 and/or training of the detection model 302).

Although the example of FIG. 9 illustrates an explicit user instruction to the electronic device 106 and an explicit instruction from the electronic device 106 to the electronic device 103 to concurrently obtain training samples, the electronic device 106 and the electronic device 103 (e.g., and/or other devices such as electronic device 102 or electronic device 107) can, in some implementations, obtain concurrent audio samples of a sound to be enrolled without receiving an explicit instruction (e.g., by implicitly activating recording of the sound).

For example, in one or more implementations, obtaining the second audio sample from the electronic device 103 may include running a pre-trained sound detector (e.g., a sound detector pretrained off device to broadly detect a class of sounds that includes the sound to be enrolled) at the electronic device 106 while the (e.g., same) pre-trained sound detector runs at the electronic device 103. In various implementations, the first audio sample may be recorded at the electronic device 106 responsive to a detection of the sound by the pre-trained sound detector at the electronic device 106 or the pre-trained sound detector at the electronic device 103, and the second audio sample may be received from the electronic device 103 responsive to the detection of the sound by the pre-trained sound detector at the electronic device 106 or the pre-trained sound detector at the electronic device 103.

In one or more use cases, recording the first audio sample at the electronic device 106 may include recording the first audio sample at the electronic device 106 responsive to the detection of the sound by the pre-trained sound detector at the electronic device 106 and the electronic device 106 may, responsive to the detection of the sound by the pre-trained sound detector at the electronic device 106, instruct the electronic device 103 to record the second audio sample. In one or more use cases, recording the first audio sample at the electronic device 106 may include recording the first audio sample at the electronic device 106 responsive to an indication from the electronic device 103 of the detection of the sound by the pre-trained sound detector at the electronic device 103.

In these examples, one or more devices (e.g., the electronic device 106, the electronic device 103, and/or other electronic devices associated with a common account with the electronic device 103 and/or the electronic device 106) may be running pre-trained sound detectors corresponding to one or more classes (e.g., user-selected classes). In these examples, when any of the devices running the pre-trained sound detectors detects a likely candidate for a target sound, that device records the audio corresponding to the likely candidate at the device (e.g., by storing the last several seconds of audio input received prior to, during, and after the detection). The devices may then coordinate with each other to identify audio recordings captured by the devices with the same time-stamp. In one or more implementations, one designated device (e.g., the electronic device 106) may act as a host for the coordination of the recorded audio from the various devices. In one or more implementations, one of the devices having a fixed location and/or a higher compute capability than one or more of the other devices may be selected as the host. In one or more implementations, the host (e.g., a curator module 600 at the host) may aggregate, verify, process, reject, and/or sanitize the various audio recordings from the various devices. In one or more implementations, sound clips collected by the various devices through the enrollment period may be presented in a user interface (UI) of the host device, to allow a user of the host device to validate whether the presented sound clips include the target sound(s). Since multiple time-aligned copies of the audio may be collected by the host from various devices, the user may be presented with only selected ones of the sound clips (e.g., a highest quality sound clip as determined by the curator module 600), which may reduce the labeling burden on the user in some implementations.

In various use cases, electronic device 106 and other devices (e.g., electronic device 103) may be located at different positions or locations with respect to the source of a sound to be enrolled, and obtaining the audio samples with the other devices may provide useful additional positive samples that can be used to generate the reference sound for the trigger model 300 and/or to train the detection model 302. For example, FIG. 10 illustrates an example in which the electronic device 106 is located at a first position relative a source 1000 of a sound to be enrolled for detection by the electronic device 106, and the electronic device 103 is located at a second position (e.g., a different position) relative to the source 1000 of the sound.

Because the electronic device 106 and the electronic device 103 may receive the sound from the source 1000 at different angles, at different times (e.g., due to different distances from the source) and/or with different background noise and/or reflections of the sound, the first sample input obtained by the electronic device 106 and the second sample input obtained by the electronic device 103 may provide two useful positive samples of the sound for training and/or generation of a reference sound.

Figure 10:
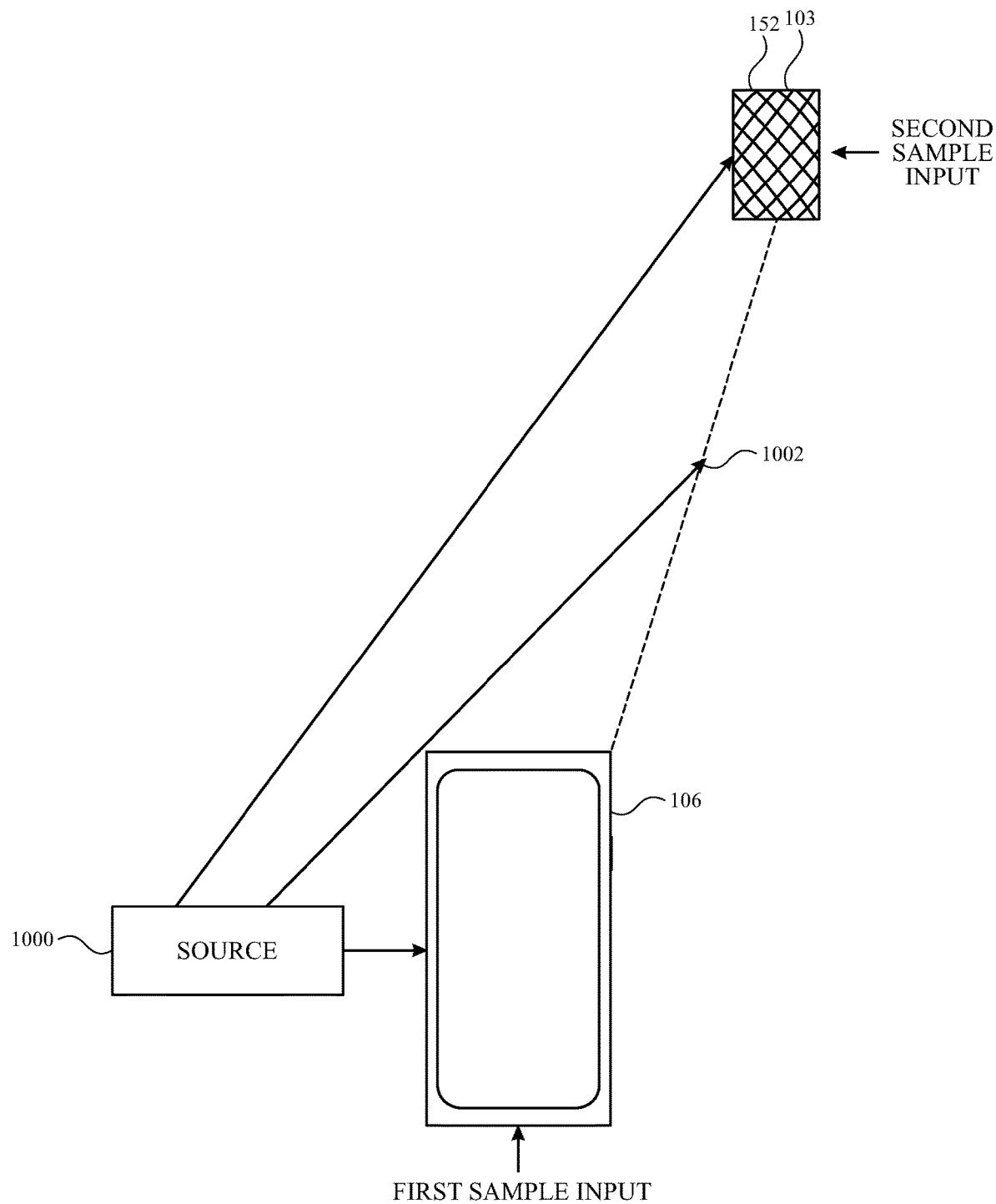
FIG. 10 illustrates aspects of a training operation using training audio samples obtained by an electronic device and another electronic device in accordance with one or more implementations

FIG. 10 also illustrates how, in one or more implementations, generating (e.g., by the augmentation module 602) additional training samples for training of the detection model 302 may include interpolating between the audio samples obtained by the electronic device 106 and the electronic device 103. For example, generating (e.g., by the augmentation module 602) one or more interpolated samples between the first sample input and the second sample input may generate additional positive training samples that approximate training samples obtained from additional interpolated locations, such as a location 1002 between the electronic device 106 and the electronic device 103.

Figure 11:
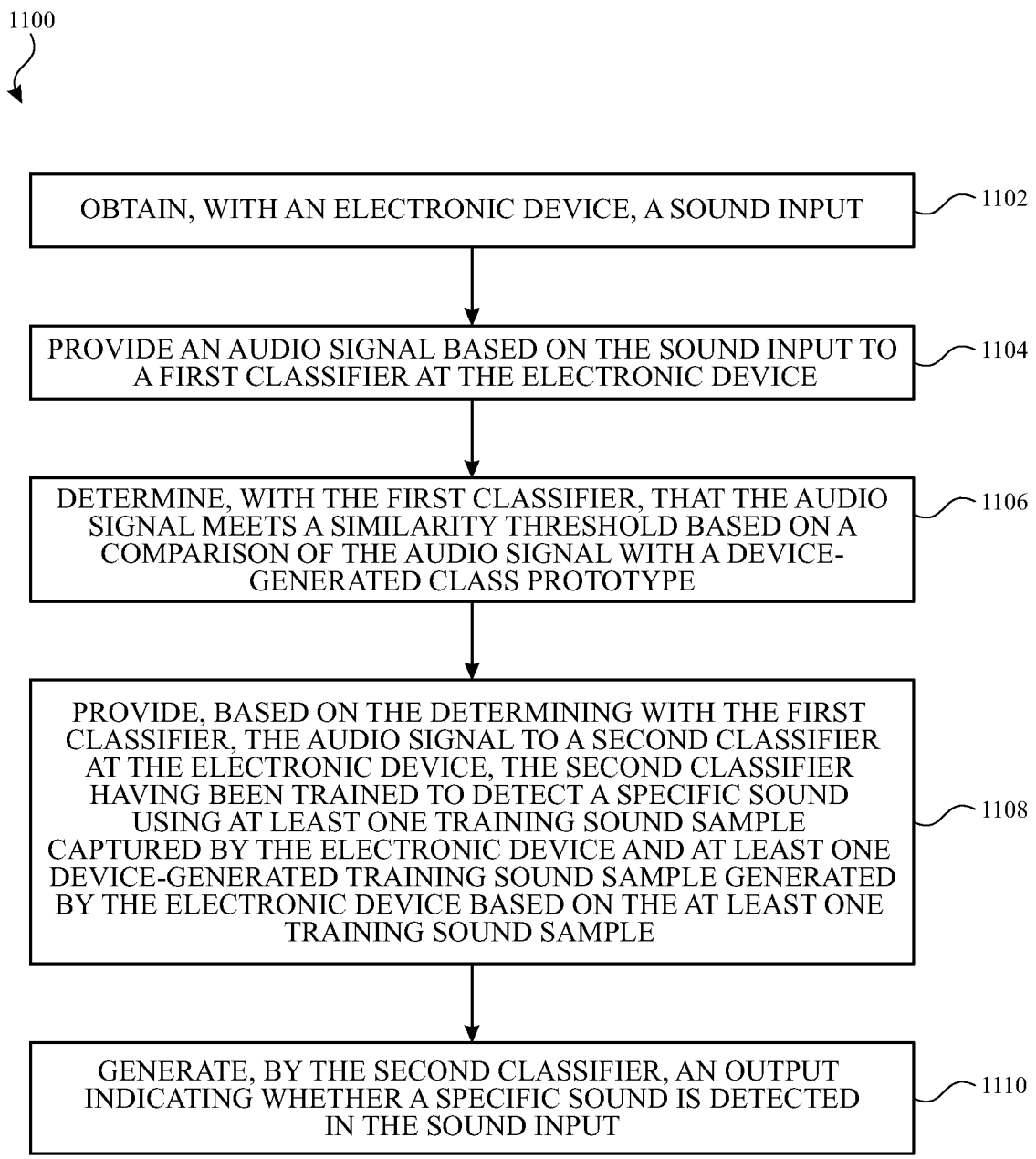
FIG. 11 illustrates a flow diagram of an example process that can be performed by an electronic device for sound detection in accordance with one or more implementations.

FIG. 11 illustrates a flow diagram of an example process 1100 for detecting sounds with an electronic device in accordance with one or more implementations. For explanatory purposes, the process 1100 is primarily described herein with reference to the electronic device 106 of FIG. 1. However, the process 1100 is not limited to the electronic device 106 of FIG. 1, and one or more blocks (or operations) of the process 1100 may be performed by one or more other suitable devices. Further for explanatory purposes, the blocks of the process 1100 are described herein as occurring in serial, or linearly. However, multiple blocks of the process 1100 may occur in parallel. In addition, the blocks of the process 1100 need not be performed in the order shown and/or one or more blocks of the process 1100 need not be performed and/or can be replaced by other operations.

At block 1102, an electronic device (e.g., electronic device 106) may obtain a sound input. For example, the sound input may be obtained by a microphone (e.g., a microphone 152 or a microphone 803) that is installed in the electronic device or a microphone that is communicatively coupled (e.g., by a wired or wireless connection) to the electronic device. In various use cases, the sound input may correspond to the sound of an appliance, a pet, a siren, or another sound in an acoustic scene or environment around the electronic device. In various use cases, the sound input may include a sound that was previously enrolled for detection by the electronic device 106.

At block 1104, an audio signal based on the sound input may be provided to a first classifier (e.g., a trigger model 300) at the electronic device. For example, the electronic device 106 may convert an analog sound input received by a microphone into a digital audio signal and/or may perform one or more encoding, curation, and/or other processing operations on the digital audio signal to generate the audio signal from the sound input.

At block 1106, the electronic device may determine, with the first classifier, that the audio signal meets a similarity threshold based on a comparison of the audio signal with a device-generated class prototype. For example, the device-generated class prototype may be a reference sample (e.g., a reference sound 304) generated by the electronic device based on one or more sample inputs obtained by the electronic device during a training operation (e.g., an enrollment operation to enroll a particular sound for detection by the electronic device, such as is described above in connection with FIG. 5). In one or more implementations, the comparison of the audio signal with the device-generated class prototype can be performed by determining a cosine distance between a representation of the audio signal and the device-generated class prototype. For example, the cosine distance may be compared with the similarity threshold (e.g., a distance threshold in this example).

At block 1108, the electronic device may provide, based on the determining with the first classifier, the audio signal to a second classifier (e.g., the detection model 302) at the electronic device, the second classifier having been trained (e.g., as described above in connection with FIG. 5) to detect a specific sound using at least one training sound sample captured by the electronic device and at least one device-generated training sound sample generated by the electronic device based on the at least one training sound sample. For example, the at least one device-generated training sound sample may include at least one negative training sample generated by the electronic device based on a first modification (e.g., a first one of the transformations 608) of the at least one training sound sample, at least one positive training sample generated by the electronic device based on a second modification (e.g., a second one of the transformations 608) of the at least one training sound sample.

At block 1110, the second classifier may generate an output indicating whether a specific sound is detected in the sound input. In one or more implementations, the electronic device may generate an alert (e.g., using an output device 210 of the electronic device) if the output of the second classifier indicates that the specific sound is detected (e.g., as described above in connection with FIG. 8). As examples, the alert may include a text-based notification on a display of the electronic device, a light output (e.g., a flashing or continuous light output from a light source of the electronic device) and/or a tactile or haptic output by an actuatable component of the electronic device.

In one or more implementations, the electronic device may also (e.g., prior to receiving the sound input at block 1102) train the second classifier by providing the at least one training sound sample, the at least one negative training sample, and the at least one positive training sample as inputs to the second classifier. For example, one or more weights and/or other parameters of the second classifier may be adjusted (e.g., based on feedback from a cost function such as cost function 502 of FIG. 5) to train the second classifier by generating respective training outputs with the second classifier responsive to each of the providing the at least one training sound sample, the at least one negative training sample, and the at least one positive training sample as inputs to the second classifier and comparing (e.g., using the cost function 502) the training outputs to respective training labels (e.g., positive or negative labels) for each of the at least one training sound sample, the at least one negative training sample, and the at least one positive training sample as inputs to the second classifier. In one or more implementations, the training operation for the second classifier (e.g., the detection model 302) may include a number of training iterations that are executed. In one or more implementations, each training iteration may include a forward pass of the training data through a machine learning model, a determination of the cost function 502, and a backwards pass through the machine learning model to update the weights and parameters of the machine learning model based on the cost function. It is also appreciated that the detection model 302 is not limited to any particular type of machine learning model, such as a neural network model for example.

In one or more implementations, the at least one training sound sample includes multiple training sound samples. The electronic device may also generate the device-generated class prototype at the electronic device, in part, by segmenting (e.g., using a segmentation module 700) each of the multiple training sound samples to generate multiple corresponding training segments; selecting (e.g., using a comparator module 702) a subset of the multiple training segments based on a similarity of the training segments of the subset; and aligning (e.g., using an alignment module 704) the subset of the multiple training segments to generate a set of aligned training segments. In one or more implementations, the electronic device may select one of the aligned training segments or may combine one or more of the aligned training segments, to generate device-generated class prototype. In one or more implementations, the aligned training segments may also be provided to an augmentation module, such as augmentation module 602 for generations of the one or more negative training samples (e.g., and associated negative labels), and the one or more positive training samples (e.g., and associated positive labels). In one or more implementations, the aligned training segments may also be provided to the second classifier as training inputs associated with positive labels.

In one or more implementations, the electronic device may obtain at least a first one of the multiple training sound samples using a microphone of the electronic device. In one or more implementations, the electronic device may obtain at least a second one of the multiple training sound samples from another electronic device (e.g., the electronic device 103, the electronic device 104, the electronic device 102, the electronic device 107, the electronic device 105, or any other suitable electronic device having a microphone and/or associated with a common account with the electronic device).

Figure 12:
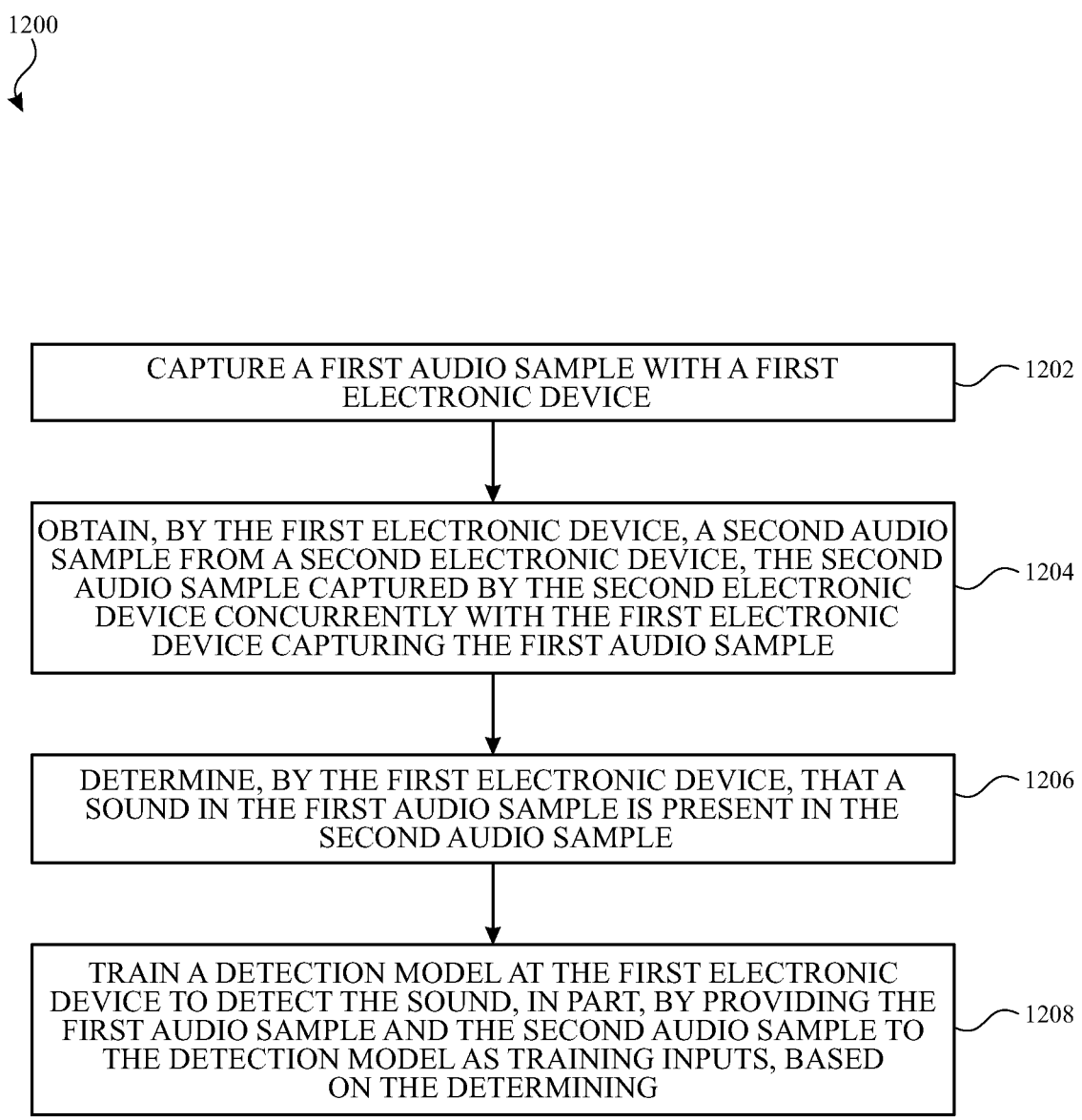
FIG. 12 illustrates a flow diagram of an example process that can be performed for training an electronic device for sound detection in accordance with one or more implementations.

FIG. 12 illustrates a flow diagram of an example process 1200 for training an electronic device to detect a sound in accordance with one or more implementations. For explanatory purposes, the process 1200 is primarily described herein with reference to the electronic device 106 and the electronic device 103 of FIG. 1. However, the process 1200 is not limited to the electronic device 106 and the electronic device 103 of FIG. 1, and one or more blocks (or operations) of the process 1200 may be performed by one or more other suitable devices. Further for explanatory purposes, the blocks of the process 1200 are described herein as occurring in serial, or linearly. However, multiple blocks of the process 1200 may occur in parallel. In addition, the blocks of the process 1200 need not be performed in the order shown and/or one or more blocks of the process 1200 need not be performed and/or can be replaced by other operations.

At block 1202, a first electronic device (e.g., electronic device 106) may capture a first audio sample. For example, the first electronic device may capture the first audio sample using a microphone of the first electronic device (e.g., a microphone such as microphone 803 or microphone 152 built into the first electronic device and/or a microphone coupled to the first electronic device by a wired or wireless connection). In one or more implementations, the first electronic device may capture the first audio sample responsive to receiving a user input at the first electronic device (e.g., a user selection of a record indicator 805). For example, the user input may be a user instruction to obtain the first audio sample. In one or more other implementations, the first electronic device may run a pre-trained sound detector (e.g., a general classifier trained using general training data off-device and provided to the first electronic device for detection of broadly similar sounds such as a generic washing machine detector or a generic doorbell detector). In some use cases, the first electronic device may capture the first audio sample responsive to a detection by the pre-trained sound detector at the first electronic device. In some other use cases, the first electronic device may record the first audio sample at the first electronic device responsive to an indication, from the second electronic device, of a detection of the sound by the pre-trained sound detector at the second electronic device.

At block 1204, the electronic device may obtain a second audio sample from a second electronic device (e.g., electronic device 103), the second audio sample captured by the second electronic device concurrently with the first electronic device capturing the first audio sample. In one or more implementations, the first electronic device may obtain a third audio sample from a third electronic device (e.g., electronic device 102), the third audio sample captured by the third electronic device concurrently with the first electronic device capturing the first audio sample.

In one or more implementations, obtaining the second audio sample from the second electronic device may include providing, responsive to the user input, an instruction from the first electronic device to the second electronic device to obtain the second audio sample, and receiving the second audio sample from the second electronic device responsive to providing the instruction (e.g., as described above in connection with FIG. 9). In one or more other implementations, obtaining the second audio sample from the second electronic device may include running the pre-trained sound detector at the first electronic device while the pre-trained sound detector runs at the second electronic device, and receiving the second audio sample from the second electronic device responsive to a detection of the sound by the pre-trained sound detector at the first electronic device or the pre-trained sound detector at the second electronic device.

In one or more implementations, recording the first audio sample at the first electronic device may include recording the first audio sample at the first electronic device responsive to the detection of the sound by the pre-trained sound detector at the first electronic device, and the first electronic device may, responsive to the detection of the sound by the pre-trained sound detector at the first electronic device, instruct the second electronic device to record the second audio sample. In one or more other implementations, recording the first audio sample at the first electronic device may include recording the first audio sample at the first electronic device responsive to an indication from the second electronic device of the detection of the sound by the pre-trained sound detector at the second electronic device At block 1206, the first electronic device may determine that a sound in the first audio sample is present in the second audio sample. In one or more implementations, the first electronic device may also determine that the sound in the first audio sample is not present in the third audio sample (e.g., from the third electronic device, such as electronic device 102). For example, the first and second electronic devices may be located within audible range of a source (see, e.g., source 1000 of FIG. 10) of the sound, and the third electronic device may be located out of audible range of the source of the sound or may be embedded in noise environment that audibly masks the sound.

At block 1208, the first electronic device may train a detection model (e.g., detection model 302) at the first electronic device to detect the sound, in part, by providing the first audio sample and the second audio sample to the detection model as training inputs, based on the determining (e.g., the determining that the second audio sample includes the same sound as the first audio sample). In one or more implementations, training the detection model may include training the detection model without providing the third audio sample to the detection model (e.g., based on determining that the sound is not present in the third audio sample). In one or more implementations, the first electronic device may align the first audio sample and the second audio sample (e.g., in time) prior to the providing the first audio sample and the second audio sample to the detection model as the training inputs.

In one or more implementations, prior to training the detection model at the electronic first device, the first electronic device may provide (e.g., using a display of the first electronic device) a request for user confirmation, the request including at least one of the first audio sample and the second audio sample. In one or more implementations, the first electronic device may select one of the first audio sample or the second audio sample (e.g., based on a quality metric of each audio sample) to include in the request. In one or more implementations, providing the request may include providing the selected one of the first audio sample or the second audio sample to a user (e.g., for playback by the user), the request including a request for confirmation that the selected one of the first audio sample or the second audio sample includes a target sound for training of the detection model.

In one or more implementations, the first electronic device (e.g., augmentation module 602 at the electronic device 106) may also generate at least one additional audio sample using the first audio sample and the second audio sample. In one or more implementations, the first electronic device may train the detection model, in part, by providing the first audio sample, the second audio sample, and the at least one additional audio sample to the detection model as training inputs (e.g., as described above in connection with FIGS. 5-7).

In one or more implementations, generating the at least one additional audio sample may include applying (e.g., by the augmentation module 602) one or more first modifications (e.g., one or more of the transformations 608) to the first audio sample and/or the second audio sample to generate one or more negative audio samples. In one or more implementations, generating the at least one additional audio sample may include applying (e.g., by the augmentation module 602) one or more second modifications (e.g., one or more others of the transformations 608) to the first audio sample and/or the second audio sample to generate one or more positive audio samples.

In one or more implementations, capturing the first audio sample with the first electronic device may include capturing the first audio sample with the first electronic device while the first electronic device is at a first location, and the second audio sample may have been captured by the second electronic device concurrently with the first electronic device capturing the first audio sample while the second electronic device is at a second location. In these implementations, the at least one additional audio sample may correspond to an intermediate location between the first location and the second location. For example, generating the at least one additional audio sample may include interpolating the first audio sample and the second audio sample (e.g., generating an interpolated sample between the first audio sample and the second audio sample, as described above in connection with FIG. 10.

In accordance with one or more implementations, the subject technology may provide a few-shot classification system. For example, the few-shot classification system may implement a two-stage inference architecture as described herein, which may also be provided in conjunction with a user-controllable class-valence-transformation-module in some examples. In one or more implementations, the two-stage inference architecture may include a first pass system for extra-category disambiguation and a second pass system for intra-category disambiguation, as well as a function bank for data augmentation, so that only few (e.g., 3-5) examples of the target class (e.g., as well as specification of negative and (optionally) positive augmentation types from the user) are obtained for training.

In one or more implementations, two-shot classification systems are provided that use a two-stage inference architecture in conjunction with a pre-configured class-valence-transformation-module. In one or more implementations, augmentation types may be inferred from the data examples of the target class provided by the user. In one or more implementations, a method is provided to extract audio sections with a target sound out of multiple recordings, without previous knowledge about the target sound, and generate distributed representation of sounds computed using a pretrained feature extractor (e.g., an embedding extractor).

In one or more implementations, few-shot classification systems are provided that use a two-stage inference architecture in conjunction with a user-controllable class-valence-transformation-module, which uses an audio-curation system to discover and/or curate target class examples from streaming audio. In one or more implementations, a user can submit multiple examples of a target class in unsegmented form, and the system may extract specific audio sections from the multiple examples. In one or more implementations, the user provides input about the specific section of the audio examples in which the target sounds are included in the audio examples.

In one or more implementations, an electronic device may obtain training samples for enrollment of a sound for detection by the electronic device (e.g., by prompting a user to obtain the samples with the device), curate the audio samples (e.g., by segmenting out the portion of the audio sample that contains the sound, selecting segmented samples that have similar audio characteristics, and aligning the selected segmented samples), generate a reference sample for a trigger model from the aligned, selected, segmented samples, generate additional samples (e.g., negative samples and positive samples) by transforming and/or manipulating/modifying (e.g., time shuffling, reverb, etc.) the aligned, selected, segmented samples (e.g., using user input as a guide to transformations that generate positive vs. negative in some examples), and train a detection model using the aligned, selected, segmented samples, the reference sample, and/or the additional samples generated at the device based on the aligned, selected, segmented samples. In this way, device resources for gathering a minimal amount of sample data (e.g., five samples, ten samples, less than ten samples, etc.) can be leveraged to generate sufficient training data for training the device to detect and/or recognize individual sounds of interest. Moreover, because the training can be performed on-device, the privacy of the user can be protected, for example, by avoiding sending local audio samples of the user's environment off-device for training (e.g., in combination with a larger external dataset).

As described above, one aspect of the present technology is the gathering and use of data available from specific and legitimate sources for companion device authentication. The present disclosure contemplates that in some instances, this gathered data may include personal information data that uniquely identifies or can be used to identify a specific person. Such personal information data can include demographic data, location-based data, online identifiers, telephone numbers, email addresses, home addresses, encryption information, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used for detecting sounds in an acoustic scene. Accordingly, use of such personal information data may facilitate authentication operations. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of detecting sounds in an acoustic scene, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 13:
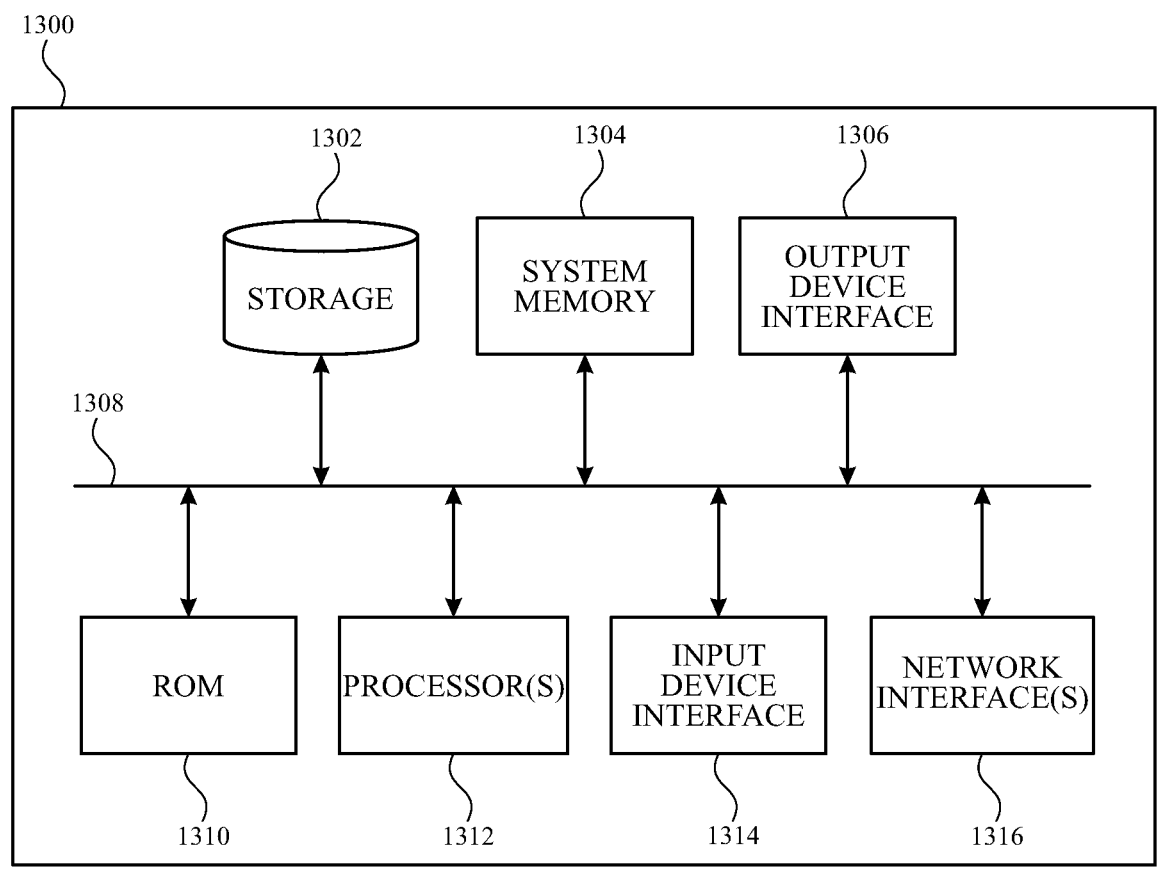
FIG. 13 illustrates an example electronic system with which aspects of the subject technology may be implemented in accordance with one or more implementations.

FIG. 13 illustrates an electronic system 1300 with which one or more implementations of the subject technology may be implemented. The electronic system 1300 can be, and/or can be a part of, one or more of the electronic devices 102-107 and/or the server 114 shown in FIG. 1. The electronic system 1300 may include various types of computer readable media and interfaces for various other types of computer readable media. The electronic system 1300 includes a bus 1308, one or more processing unit(s) 1312, a system memory 1304 (and/or buffer), a ROM 1310, a permanent storage device 1302, an input device interface 1314, an output device interface 1306, and one or more network interfaces 1316, or subsets and variations thereof.

The bus 1308 collectively represents all system, peripheral, and chipset buses that communicatively connect the numerous internal devices of the electronic system 1300. In one or more implementations, the bus 1308 communicatively connects the one or more processing unit(s) 1312 with the ROM 1310, the system memory 1304, and the permanent storage device 1302. From these various memory units, the one or more processing unit(s) 1312 retrieves instructions to execute and data to process in order to execute the processes of the subject disclosure. The one or more processing unit(s) 1312 can be a single processor or a multi-core processor in different implementations.

The ROM 1310 stores static data and instructions that are needed by the one or more processing unit(s) 1312 and other modules of the electronic system 1300. The permanent storage device 1302, on the other hand, may be a read-and-write memory device. The permanent storage device 1302 may be a non-volatile memory unit that stores instructions and data even when the electronic system 1300 is off. In one or more implementations, a mass-storage device (such as a magnetic or optical disk and its corresponding disk drive) may be used as the permanent storage device 1302.

In one or more implementations, a removable storage device (such as a floppy disk, flash drive, and its corresponding disk drive) may be used as the permanent storage device 1302. Like the permanent storage device 1302, the system memory 1304 may be a read-and-write memory device. However, unlike the permanent storage device 1302, the system memory 1304 may be a volatile read-and-write memory, such as random access memory. The system memory 1304 may store any of the instructions and data that one or more processing unit(s) 1312 may need at runtime. In one or more implementations, the processes of the subject disclosure are stored in the system memory 1304, the permanent storage device 1302, and/or the ROM 1310. From these various memory units, the one or more processing unit(s) 1312 retrieves instructions to execute and data to process in order to execute the processes of one or more implementations.

The bus 1308 also connects to the input and output device interfaces 1314 and 1306. The input device interface 1314 enables a user to communicate information and select commands to the electronic system 1300. Input devices that may be used with the input device interface 1314 may include, for example, microphones, alphanumeric keyboards, touchscreens, touchpads, and pointing devices (also called "cursor control devices"). The output device interface 1306 may enable, for example, the display of images generated by electronic system 1300. Output devices that may be used with the output device interface 1306 may include, for example, speakers, printers and display devices, such as a liquid crystal display (LCD), a light emitting diode (LED) display, an organic light emitting diode (OLED) display, a flexible display, a flat panel display, a solid state display, a projector, a light source, a haptic components, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 13, the bus 1308 also couples the electronic system 1300 to one or more networks and/or to one or more network nodes, such as the server 114 shown in FIG. 1, through the one or more network interface(s) 1316. In this manner, the electronic system 1300 can be a part of a network of computers (such as a LAN, a wide area network ("WAN"), or an Intranet, or a network of networks, such as the Internet. Any or all components of the electronic system 1300 can be used in conjunction with the subject disclosure.

In accordance with aspects of the disclosure, a method is provided that includes obtaining, with an electronic device, a sound input; providing an audio signal based on the sound input to a first classifier at the electronic device; determining, with the first classifier, that the audio signal meets a similarity threshold based on a comparison of the audio signal with a device-generated class prototype; providing, based on the determining with the first classifier, the audio signal to a second classifier at the electronic device, the second classifier having been trained to detect a specific sound using at least one training sound sample captured by the electronic device and at least one device-generated training sound sample generated by the electronic device based on the at least one training sound sample; and generating, by the second classifier, an output indicating whether a specific sound is detected in the sound input.

In accordance with aspects of the disclosure, an electronic device is provided that includes a memory storing: a trigger model, a reference sound generated at the electronic device, and a detection model trained to detect a specific sound using at least one training sound sample captured by the electronic device and at least one device-generated training sound sample generated by the electronic device based on the at least one training sound sample; and one or more processors, the one or more processors configured to: obtain a sound input; trigger the detection model by comparing, with the trigger model, an audio signal based on the sound input with the reference sound; and determine whether the sound input includes the specific sound by providing the audio signal to the detection model.

In accordance with aspects of the disclosure, a method is provided that includes capturing a first audio sample with a first electronic device; obtaining, by the first electronic device, a second audio sample from a second electronic device, the second audio sample captured by the second electronic device concurrently with the first electronic device capturing the first audio sample; determining, by the first electronic device, that a sound in the first audio sample is present in the second audio sample; and training a detection model at the first electronic device to detect the sound, in part, by providing the first audio sample and the second audio sample to the detection model as training inputs, based on the determining.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
   obtaining, with an electronic device, a sound input;
   providing an audio signal based on the sound input to a first classifier at the electronic device;
   determining, with the first classifier, that the audio signal meets a similarity threshold based on a comparison of the audio signal with a device-generated class prototype;
   providing, based on the determining with the first classifier, the audio signal to a second classifier at the electronic device, the second classifier having been trained to detect a specific sound using at least one training sound sample captured by the electronic device and at least one device-generated training sound sample generated by the electronic device based on the at least one training sound sample; and
   generating, by the second classifier, an output indicating whether a specific sound is detected in the sound input.

2. The method of claim 1, further comprising generating an alert with the electronic device if the output of the second classifier indicates that the specific sound is detected.

3. The method of claim 1, wherein the at least one device-generated training sound sample includes:
   at least one negative training sample generated by the electronic device based on a first modification of the at least one training sound sample, and
   at least one positive training sample generated by the electronic device based on a second modification the at least one training sound sample.

4. The method of claim 3, further comprising training the second classifier at the electronic device by providing the at least one training sound sample, the at least one negative training sample, and the at least one positive training sample as inputs to the second classifier.

5. The method of claim 4, wherein the at least one training sound sample comprises a plurality of training sound samples, the method further comprising generating the device-generated class prototype at the electronic device, in part, by:
   segmenting of each of the plurality of training sound samples to generate a corresponding plurality of training segments;
   selecting a subset of the plurality of training segments based on a similarity of the training segments of the subset; and
   aligning the subset of the plurality of training segments to generate a set of aligned training segments.

6. The method of claim 5, further comprising obtaining at least a first one of the plurality of training sound samples using a microphone of the electronic device.

7. The method of claim 6, further comprising obtaining at least a second one of the plurality of training sound samples from another electronic device.

8. The method of claim 1, wherein the comparison of the audio signal with the device-generated class prototype comprises a determination of a cosine distance between a representation of the audio signal and the device-generated class prototype.

9. An electronic device, comprising:
   a memory storing:
      a trigger model,
      a reference sound generated at the electronic device, and
      a detection model trained to detect a specific sound using at least one training sound sample captured by the electronic device and at least one device-generated training sound sample generated by the electronic device based on the at least one training sound sample; and
   one or more processors, wherein the one or more processors are configured to:
      obtain a sound input;
      trigger the detection model by comparing, with the trigger model, an audio signal based on the sound input with the reference sound; and
      determine whether the sound input includes the specific sound by providing the audio signal to the detection model.

10. The electronic device of claim 9, wherein the one or more processors are further configured to generate the reference sound based on a plurality of training inputs to the electronic device.

11. The electronic device of claim 9, further comprising an output component configured to generate a notification responsive to a determination, by the detection model, that the sound input includes the specific sound.

12. The electronic device of claim 9, further comprising a microphone configured to obtain the sound input.

13. The electronic device of claim 12, wherein the one or more processors are further configured to:
obtain the at least one training sound sample using the microphone; and
generate the reference sound based on the at least one training sound sample.

14. The electronic device of claim 13, wherein the one or more processors are further configured to:
generate the at least one device-generated training sound sample by:
generating at least one negative training sample by applying a first modification of the at least one training sound sample, and
generate at least one positive training sample by applying a second modification to the at least one training sound sample.

15. The electronic device of claim 14, wherein the one or more processors are further configured to train the detection model by providing the at least one training sound sample, the at least one negative training sample, and the at least one positive training sample to the detection model as training inputs.

16. The electronic device of claim 13, wherein the one or more processors are further configured to obtain at least one additional training sound sample from another electronic device.

17. An electronic device, comprising:
a memory; and
one or more processors configured to:
obtain a sound input;
provide an audio signal based on the sound input to a first classifier at the electronic device;
determine, with the first classifier, that the audio signal meets a similarity threshold based on a comparison of the audio signal with a device-generated class prototype;
provide, based on the determining with the first classifier, the audio signal to a second classifier at the electronic device, the second classifier having been trained to detect a specific sound using at least one training sound sample captured by the electronic device and at least one device-generated training sound sample generated by the electronic device based on the at least one training sound sample; and
generate, by the second classifier, an output indicating whether the specific sound is detected in the sound input.

18. The electronic device of claim 17, wherein the one or more processors are further configured to generate an alert with the electronic device if the output of the second classifier indicates that the specific sound is detected.

19. The electronic device of claim 17, wherein the at least one device-generated training sound sample includes:
at least one negative training sample generated by the electronic device based on a first modification of the at least one training sound sample, and
at least one positive training sample generated by the electronic device based on a second modification the at least one training sound sample.

20. The electronic device of claim 19, wherein the one or more processors are further configured to train the second classifier at the electronic device by providing the at least one training sound sample, the at least one negative training sample, and the at least one positive training sample as inputs to the second classifier.

21. The electronic device of claim 20, wherein the at least one training sound sample comprises a plurality of training sound samples, and wherein the one or more processors are further configured to generate the device-generated class prototype at the electronic device, in part, by:
segmenting of each of the plurality of training sound samples to generate a corresponding plurality of training segments;
selecting a subset of the plurality of training segments based on a similarity of the training segments of the subset; and
aligning the subset of the plurality of training segments to generate a set of aligned training segments.

22. The electronic device of claim 21, wherein the one or more processors are further configured to obtain at least a first one of the plurality of training sound samples using a microphone of the electronic device.

23. The electronic device of claim 22, wherein the one or more processors are further configured to obtain at least a second one of the plurality of training sound samples from another electronic device.

24. The electronic device of claim 23, wherein the electronic device is associated with an account and the other electronic device is also associated with the account.

25. The electronic device of claim 17, wherein the comparison of the audio signal with the device-generated class prototype comprises a determination of a cosine distance between a representation of the audio signal and the device-generated class prototype.

26. The electronic device of claim 17, wherein the first classifier comprises a trigger model and the second classifier comprises a detection model.

27. The electronic device of claim 26, wherein the one or more processors are further configured to provide, to the detection model along with the audio signal, a trigger signal to activate the detection model to generate the output indicating whether the specific sound is detected in the sound input.

28. The electronic device of claim 17, wherein the specific sound comprises a sound that has been previously enrolled for detection by the electronic device.

* * * * *

UNITED STATES PATENT AND TRADEMARK OFFICE
CERTIFICATE OF CORRECTION

PATENT NO. : 12,182,674 B2
APPLICATION NO. : 17/737017
DATED : December 31, 2024
INVENTOR(S) : Jonathan Huang et al.

Page 1 of 1

It is certified that error appears in the above-identified patent and that said Letters Patent is hereby corrected as shown below:

In the Claims

Column 28, Line 4 (Claim 1): Replace "whether a specific", with --whether the specific--.

Signed and Sealed this
Twenty-ninth Day of April, 2025

Coke Morgan Stewart
*Acting Director of the United States Patent and Trademark Office*